United States Patent
Rizzo et al.

(10) Patent No.: US 9,497,065 B2
(45) Date of Patent: Nov. 15, 2016

(54) SERVICE SESSION RESOURCE MANAGEMENT

(75) Inventors: Michael Rizzo, Ipswich (GB); Steven Rudkin, Ipswich (GB)

(73) Assignee: BRITISH TELECOMMUNICATIONS, London (GB)

( * ) Notice: Subject to any disclaimer, the term of this patent is extended or adjusted under 35 U.S.C. 154(b) by 420 days.

(21) Appl. No.: 13/985,072

(22) PCT Filed: Feb. 23, 2012

(86) PCT No.: PCT/GB2012/000187
§ 371 (c)(1),
(2), (4) Date: Aug. 13, 2013

(87) PCT Pub. No.: WO2012/114073
PCT Pub. Date: Aug. 30, 2012

(65) Prior Publication Data
US 2013/0339529 A1    Dec. 19, 2013

(30) Foreign Application Priority Data

| Feb. 26, 2011 | (GB) | ................................. | 1103422.0 |
| Mar. 3, 2011 | (GB) | ................................. | 1103687.8 |
| Mar. 14, 2011 | (EP) | ................................. | 11250301 |

(51) Int. Cl.
*G06F 15/173* (2006.01)
*H04L 29/08* (2006.01)
*H04L 12/14* (2006.01)

(52) U.S. Cl.
CPC ........... *H04L 29/0845* (2013.01); *H04L 12/14* (2013.01); *H04L 67/322* (2013.01)

(58) Field of Classification Search
CPC ............. H04L 12/5695; H04L 29/0845; H04L 47/15; H04L 47/822; H04L 67/322;
(Continued)

(56) References Cited

U.S. PATENT DOCUMENTS

| 6,738,816 B1 | 5/2004 | Li et al. |
| 6,738,819 B1 * | 5/2004 | Li ....................... H04L 12/5695 370/230 |

(Continued)

FOREIGN PATENT DOCUMENTS

| WO | 2007/081171 | 7/2007 |
| WO | WO 2007/081171 | 7/2007 |

OTHER PUBLICATIONS

Office Action (9 pages) dated Oct. 27, 2015, issued in corresponding Chinese Application No. 201280010376.X and English translation (10 pages).

(Continued)

*Primary Examiner* — Dustin Nguyen
*Assistant Examiner* — Hao Nguyen
(74) *Attorney, Agent, or Firm* — Nixon & Vanderhye P.C.

(57) ABSTRACT

A service session resource manager (72) for use in a router (18) capable of routing a plurality of at least partially contemporaneous service sessions over a communications line is described which mediates between services competing for bandwidth. The service session manager (72) updates its internal state based on both mediation enabled (22b) and mediation non-enabled (22a) devices. The resource manager (72) comprises memory arranged to store a current resource utilization indicator for a resource of said communications line, a service request processor arranged to process a new service session request from a client terminal to determine a required resource for said new service session over said communications line and to determine if the required resource is available in dependence on an available line rate and said current utilization indicator, means to reserve the required resource, means to update said current utilization indicator to indicate the allowed resource reservation; and means to respond to said requesting client that said resources have been reserved, wherein said current resource utilization (Continued)

indicator is also updated by said service request processor to indicate a resource used by one or more service sessions established by one or more client terminals configured to send service requests over said communications line without requesting access to the service from said service session manager.

25 Claims, 14 Drawing Sheets

(58) Field of Classification Search
CPC ............... H04L 12/2834; H04L 43/16; H04L 45/302; H04L 47/781; H04L 65/80; H04L 67/14; H04L 12/14; H04L 47/782; H04Q 2213/13251; G06F 9/50; H04N 21/26216
USPC ........ 709/226, 229, 217, 218, 219; 713/153, 713/154
See application file for complete search history.

(56) References Cited

U.S. PATENT DOCUMENTS

| | | | |
|---|---|---|---|
| 2004/0249944 A1* | 12/2004 | Hosking | G06F 9/50 709/225 |
| 2006/0026004 A1* | 2/2006 | Van Nieuwenhuizen | H04L 12/14 709/233 |
| 2007/0133603 A1* | 6/2007 | Weaver | H04L 43/0882 370/468 |
| 2008/0075116 A1* | 3/2008 | Holierhoek | H04L 12/5695 370/468 |
| 2008/0140842 A1 | 6/2008 | Kwang-Il et al. | |
| 2010/0005154 A1* | 1/2010 | Song | H04L 12/2803 709/219 |
| 2012/0082440 A1* | 4/2012 | Kitazato | G11B 27/034 386/353 |
| 2012/0133731 A1* | 5/2012 | Lin | H04N 13/0051 348/42 |

OTHER PUBLICATIONS

Partial European Search Report (2 pgs.) dated Sep. 9, 2011 issued in corresponding European Application No. 11 25 0301.

UPNP Forum: "UPnP-QoS Architecture: 3", Internet Citation, Nov. 30, 2008, pp. 1-47, XP002521469.

Ditze. M. et al., "Towards end-to-end QoS in service oriented architectures", Industrial Informatics, 2005. INDIN '05. 2005 $3^{rd}$ IEEE International Conference on, Perth, Austrialia Aug. 10-12, 2005.

International Search Report for PCT/GB2012/000187, mailed Apr. 27, 2012.

Ditze, M. et al., "Towards end-to-end QoS in service oriented architectures", Industrial Informatics, (Aug. 10, 2005), pp. 92-97.

Office Action dated Oct. 27, 2015 issued in corresponding Chinese Application No. 201280010376.X (10 pgs.).

Office Action dated Jul. 5, 2016 issued in corresponding Chinese Application No. 201280010376 (9 pgs.) with an at least partial English-language translation (7 pgs.).

* cited by examiner

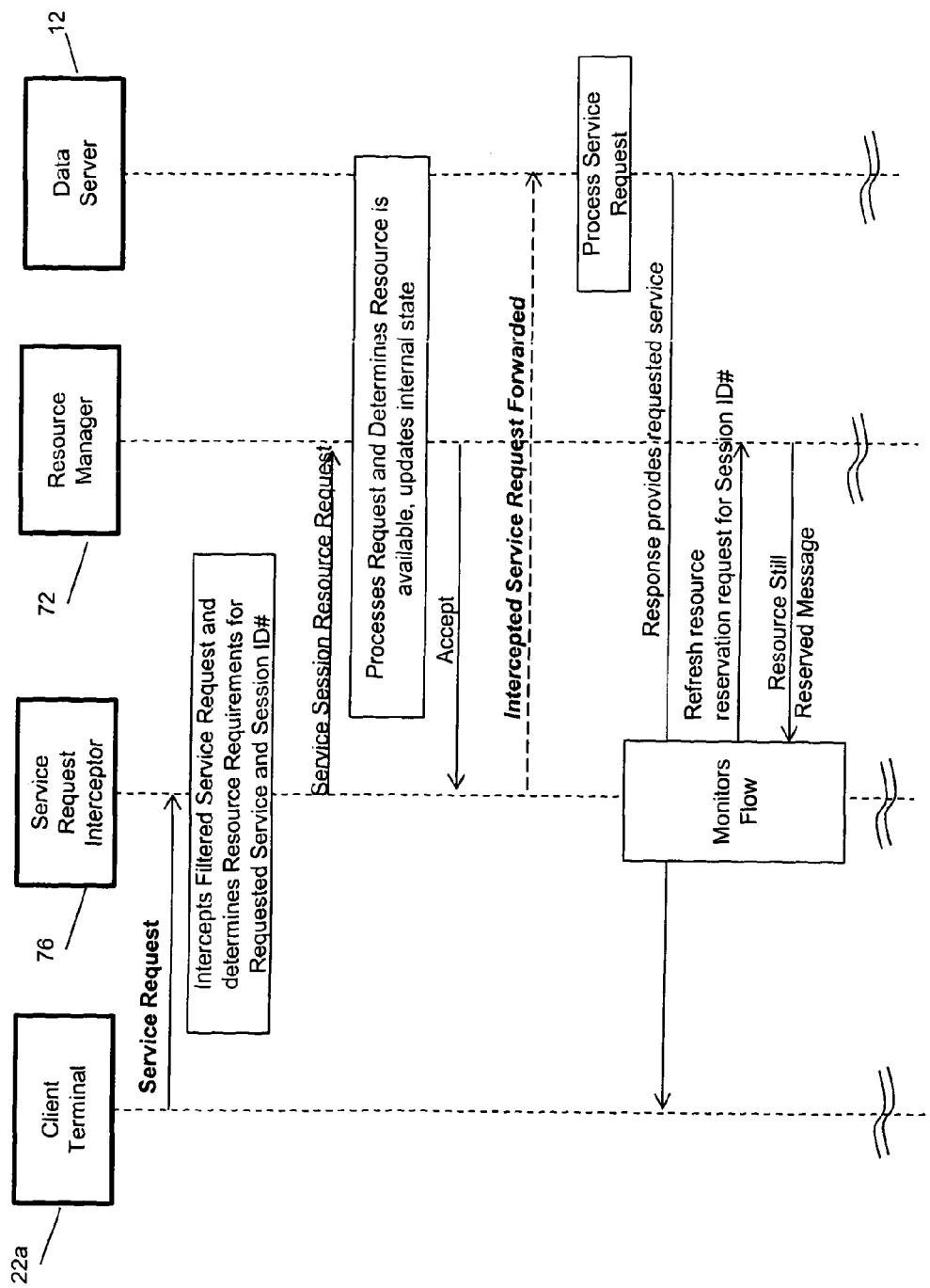

SERVICE SESSION RESOURCE MANAGEMENT

This application is the U.S. national phase of International Application No. PCT/GB2012/000187, filed 23 Feb. 2012, which designated the U.S. and claims priority to GB Application No. 1103422.0 filed 26 Feb. 2011; GB Application No. 1103687.8, filed 3 Mar. 2011; and EP Application No. 11250301.6, filed 14 Mar. 2011, the entire contents of each of which are hereby incorporated by reference.

BACKGROUND AND SUMMARY

This invention relates to service session resource management, in particular but not exclusively, to the management of bandwidth for concurrent use by multiple services in a local area network of devices. An example of such a local area network is one on the premises of a subscriber to a broadband communications access service, for example, one provided as part of a domestic or small business network installation to enable a plurality of devices to access services over a single broadband-enabled communications line.

There is expected to be a growing demand for simultaneous use of multiple services by devices located within the same local area network (LAN), which require concurrent use of a single broadband access line. This demand is driven by factors such as the availability of higher broadband speeds, the proliferation of multiple internet-enabled devices in the home, multi-user households, and an increasing amount of content available on the Internet, in particular the proliferation of video services. Managing the simultaneous use of a single broadband line for access to multiple services requires careful management of the available bandwidth over the access network as well as within the home network located on the service subscriber premises.

Generally, it is not possible for a broadband access service provider to determine what combination of services will be available to a customer at the point-of-sale of the broadband access service, nor even at the point-of-sale of any services predicated on having broadband access. For example, if a customer has two digital television decoders (often known as set-top boxes (STBs), although rarely actually placed on top of a television set), a broadband line rate of 10 Mbps would allow both STBs to display a different streamed content channel simultaneously if each streamed content channel comprises a standard definition (SD) television (TV) channel, but if a high definition (HD) TV channel stream is required, the extra bandwidth it requires would preclude streaming of a second channel (SD or HD) over the broadband line. To implement an appropriate mediation service between multiple devices, real-time decisions must be made, at the point-of-use, about what can be done, without compromising access to services and the quality of service (QoS) of the services accessed.

FIG. 1 of the accompanying drawings show part of a communications system 10 in which data from one or more external data sources 12 is streamed via a Multi-Service Access Node (MSAN) 14 over a broadband access line 16 to an access point/router device 18 which provides broadband access to a plurality of user terminals 22, 24 located in a local area network 20 provided at the broadband access line service subscriber's premises. As shown in FIG. 1, the access point/router 18 also provides router support to the user terminals 22, 24 enabling multiple simultaneous internal sessions to occur over wired communications link(s) 26 (for example, Powerline and/or Ethernet links) and/or wireless communications links 28 (for example, WLAN or WIFI links) as well as supporting external sessions over access line 16 between the user terminals 22, 24 and external content source 16. An example of such an integrated access point/router 18 known in the art is the BT HomeHub™. Examples of user terminals include data consuming client devices 22, for example, devices which consume content data such as STBs, Internet Protocol (IP) enabled TVs, media streamers, tablet devices, audio/video players, computer devices and mobile/fixed telephone devices. Examples of user terminals also include data source devices 24 located within LAN 20. Data source devices 24 are connected to the router 18 internally by a wired or wireless communications link 26, 28 to distribute data such as content to data consuming devices 22. Examples of internal data source devices 24 include, for example, content source devices such as Personal Video Recorder (PVR) content storing devices, as well as any other device storing content such as computers, mobile telephones, and network attached storage (NAS) devices. The terms content and the equivalent term content data are well-known in the art and generally refer to data representing audio or video content which is played back on a content consuming device, for example, films, television programs, music files, games etc., and may have a multimedia data format.

Content data usually places a high demand for bandwidth resources to playback user terminals as well as processing resources on the playback user terminals. The need to reserve resources for a new service session to access a content delivery service has to be balanced against the need to maintain the quality of service experienced by established service sessions over which content is currently being delivered. In practice, unless the bandwidth available over both the access link 16 to the router 18 and over the internal links 26, 28 between the client devices 22, 24 with the router 18 is unlimited, some mediation process must be deployed.

There are various methods for managing bandwidth over the access line to ensure that an appropriate balance between the above competing demands to access content and to maintain the QoS of the content delivered.

It is known, for example from International Patent specification WO 2007/081171, to obtain information to determine the correct amount of bandwidth to be reserved when streaming content from a server outside the home network. In this reference, an "external server" (in practice an external network comprising a plurality of servers) is model to determine the capacity required. U.S. Pat. No. 6,738,819 describes a method for performing admission control based on network load monitoring. However, in both cases, the method is operated by the individual client devices, and does not provide support for any client devices that are unable to make direct use of this capability. The allocation process would be compromised for all the client devices unless the admission control is invoked by all of them.

Local bandwidth management techniques known in the art include those which implement Universal Plug and Play (UPnP) Quality of Service (QoS) architectures such as that described in "UPnP-QoS Architecture: 3, for UPnP Version 1.0", adopted as a standardized DCP by the Steering Committee of the UPnP forum and dated: Nov. 30, 2008, the contents of which are incorporated herein in their entirety by reference. This document describes a session management device which is suitable for providing a local bandwidth management capability to enable a video streaming client to determine whether or not it is safe to start a new video-on-demand (VoD) or linear TV stream (non-VoD IPTV) without adversely impacting any existing streams. This decision can be made on the basis of knowledge of the current broadband line rate, and associated limits, and knowledge of other VoD and linear TV services running on the same line, including how much bandwidth each is consuming.

UPnP QoS enabled user terminals 22, 24 in such architectures are able to negotiate with a UPnP QoS enabled router 18 for bandwidth. The UPnP QoS router 18 mediates simultaneous use of multiple services over the same broadband line 16 and within the same network 20. For example, if a user is already using one service and an attempt is made to use a second service, and the combined bandwidth requirements of the two services exceeds the capacity either of the customer's broadband connection or of the local network 20 (e.g. if operating under the IEEE 802.11 wireless protocol known as "WiFi" then either the second attempt should be blocked or the existing connection must be suspended to allow the second one to be connected).

The most effective mediation solution requires all of the user devices 22, 24 and router 18 to fully co-operate in the mediation process. However, this will be difficult to achieve unless all the user terminals 22, 24 connected to the router 18 support the mediation capability.

FIG. 2 retains the numbering scheme of FIG. 1 for like elements and shows how a UPnP quality of service (QoS) Service Manager receiving a request from a UPnP QoS user terminal 22 for a new session (step 30) would implement such a bandwidth mediation process. The UPnP QoS Service Manager determines the available line rate over the broadband access line (either by querying this or by retrieving a stored value) and determines from its internal state awareness of the broadband access lines resources it has currently reserved for use by existing sessions if sufficient resources are available to support the new service session (step 34). If the required resources are not available, for example, if providing the resources required to support the new service session would adversely impact the QoS of the services already being provided over the one or more other sessions, an appropriate response is sent to the requesting UPnP QoS client terminal denying access to the requested service (step 46). If the resources are available, however, then the UPnP QoS Service Manager reserves the resources (step 38) and updates its internal state (step 40) so that it retains knowledge of the resources reserved for future request management. The UPnP QoS Service Manager then sends a response to the requesting UPnP QoS client terminal indicating the session resources have been reserved (step 42) and the UPnP QoS client terminal 22 then starts the new session (step 44).

FIG. 3 retains the numbering scheme of FIG. 1 for like elements and shows schematically what might happen when a client terminal 22 without the UPnP capabilities and unable to co-operate in this way with the UPnP QoS Service Manager also requests a service over access line 16. In FIG. 3, after a new session request is generated by a non-UPnP QoS enabled client terminal 22 (step 60) the new session starts to use resources over the broadband access line without prior reservation (step 62) (alternatively, it may reserve resources over the access line without reference to the UPnP QoS Service Manager). The consequent bandwidth utilisation means that existing sessions may have less bandwidth and so potentially experience a drop in their quality of service or even premature termination.

As FIG. 3 shows schematically, this use of the access line (62) affects the operation of UPnP QoS Service Manager, as its internal state is no longer accurate (64) described in FIG. 2 in two ways. Firstly, as the new session uses resources not reserved by the UPnP QoS Service Manager and, in consequence, step (34) in FIG. 2 will not retrieve the actual bandwidth utilised over the access line. Secondly, any sudden drop or termination of bandwidth utilisation by existing sessions impacted by the resource reservation (56) may also fail to be communicated to the UPnP QoS Service Manager. These effects mean that the UPnP QoS Service Manager will no longer have the correct internal state stored for the actual resource utilisation over the broadband access line. As a result, the on-going performance of the UPnP QoS Service Manager whilst the non-UPnP QoS client terminal 22 service session exists will be compromised as the QoS Service Manager will make decisions based on there being more bandwidth than is actually available for any given line rate over the broadband communications access line 16.

Accordingly, depending on circumstances and the way the router 18 mediates data requests from client terminals, non-UPnP QoS client terminals may seize all the bandwidth they require without regard to any competing requirements, or be unable to get the bandwidth they require, or abruptly lose connections during a session without warning. Similarly, UPnP QoS service management supporting client terminals will suffer due to the UPnP QoS Service Manager lacking any knowledge of the bandwidth the non-UPnP QoS client terminal sessions are consuming over the access line. None of these outcomes result in a good experience for the user.

It is therefore desirable to provide a request mediation system which will operate on data requests from all terminals connected to a router without requiring any special capabilities in the individual terminals.

A first aspect of the invention seeks to provide a service session request interceptor arranged to intercept requests for data services generated by client terminals in a communications network, the interceptor comprising: means to receive service request generated by said plurality of client terminals; means to determine a destination address of a received service request; means to intercept a service request for content from a destination address determined to match one or more predetermined intercept-triggering destination addresses; means to determine for each said intercepted service request, a resource requirement for said requested service; means to forward a resource reservation request for the required resource to a resource manager, and means to forward the received request to said destination address in dependence on receiving an indication from said resource manager that the required resource has been reserved.

The required resource for the requested service may be derived from the destination address, and specifically from the universal resource locator addressed by said service request. Alternatively, the required resource may be indicated by the format and/or content of the universal resource locator.

The resource may comprise bandwidth over a wired or wireless communications link.

The service request interceptor may further comprise means arranged to process a reject request message from said resource manager, to extract information enabling concurrent service sessions for which resources have been reserved to be identified.

The service request interceptor may further comprise:
 means to intercept a service session request generated by a service requesting client terminal;
 means to determine at least one session resource required for fulfillment of said service session request to maintain one or more predetermined delivery criteria;
 means to determine at least one required session resource is not available;
 means to reject said service request; and means to provide information to said service requesting user terminal on at least one other service session utilising said at least one service session resource, whereby a user of said client terminal is able to receive said information and in dependence thereon selectively modifying said at least one of said at least one other service sessions.

The service request interceptor may further comprise:

means to generate an information identifier for the extracted information;

means to generate a re-direct message including said information identifier;

means to send said re-direct message including said information identifier to a client terminal from which the rejected service request originated; and means to provide to a requesting data server said extracted information responsive to receiving an message requesting said extracted information from the requesting data server, the message identifying the information requested using said information identifier.

The invention also extends to a system comprising a service request interceptor as defined above, in combination with a data-server, the data server comprising:

means arranged to receive a message from a client terminal;

means to extract a said information identifier from a said received message;

means to generate said message to request information from said service request interceptor, the message including said information identifier, whereby, responsive to receiving said information from said service request interceptor, said data-server provides said information to said client terminal.

The invention also extends to a router for a local area network, the router being capable of routing a plurality of at least partially contemporaneous service sessions over a communications link, and including a service request interceptor as defined above, and further comprising a resource manager having:

means to store a current resource utilisation indicator for a resource of said communications link;

means to receive service session requests requiring resource reservation over said communications link;

means to process received requests and to reserve a required resource if available over said communications link in dependence on said current resource utilisation indicator and a determination of the maximum resource availability over said communications link, wherein said current resource utilisation indicator is updated by said service request processor responsive to requests being received from said service request interceptor to indicate a resource used by one or more service sessions established by one or more client terminals configured to send service requests over said communications line without requesting access to the service from said service session manager.

The router may further comprise:

a plurality of user ports, each port for connection to a said client terminal, an external connection port;

switching means for transmitting data, and requests for data, between the ports, and said external connection port;

a line speed checker;

one or more data processors arranged to implement said service session resource manager and arranged for processing service session data requests received at each port and to select which service session requests are to be forwarded to the external connection port.

Alternatively, the interception is performed on the router but all other functionality required to establish the resource reservation requirement, make the resource reservation request, and make a decision on the request may be implemented outside the router component, for example, on a PC, STB, NAS or another component adjunct to the router, or in a central network location.

According to a further aspect, the invention provides a method of service session resource management in which requests for data services generated, by client terminals in a communications network are intercepted:

a destination address of each received service request is determined;

identifying service requests for content to be retrieved from destination addresses determined to match one or more predetermined intercept-triggering destination addresses;

determining for each said intercepted service request, a required resource for said requested service;

generating a resource reservation request for the required resource, and determining if the required resource is available if the required resource is available, reserving the required resource, forwarding the received request to said destination address if the required resource has been reserved.

The method may further comprise updating a current resource utilisation indicator to indicate a resource used by one or more service sessions established by one or more client terminals configured to send service requests over said communications line without requesting access to the service from said service session manager.

The method may further comprise intercepting a service session request generated by a service requesting client terminal; determining at least one session resource required for fulfillment of said service session request to maintain one or more predetermined delivery criteria; determining at least one required session resource is not available; rejecting said service request; and providing information to said service requesting user terminal on at least one other service session utilising said at least one service session resource, whereby a user of said client terminal is able to receive said information and in dependence thereon selectively modifying said at least one of said at least one other service sessions.

In this way, when a client terminal which does not support UPnP QoS Service Management attempts to request a service which will use "premium" bandwidth over a access network communications link, for example by requesting a service which uses bandwidth reserved for packets forming data streams which have priority levels above a best effort forwarding class, other services also using the premium bandwidth are less likely to be unexpectedly or adversely impacted, as the UPnP QoS Service Manager can now monitor such client terminal bandwidth utilisation.

The resource manager is preferably a Universal Plug and Play (UPnP) Quality of Service (QoS) Service Manager of the type specified in a UPnP QoS Service Management Architecture standards, such as version three of the standard.

The communications link may comprise a line hosting a broadband access link such as an Asynchronous Digital Subscriber Line (ADSL) link or other type of DSL link, and the resource over said communications line may comprise the bandwidth available using said broadband access link. Alternatively, the communications link may comprise an internal link with a plurality of devices within a local area network connected via a router on which said service session resource manager is located.

The communications link may comprise wireless or wired communications channels and may be internal to other client devices or external to the LAN.

Where appropriate, a router device is configured to hold an estimate of the capacity of the available bandwidth (or equivalently data rate) over the communications channel and makes this available to the QoS Service Session Manager. The value indicated to the QoS Service Session Manager (or used by the QoS Service Session Manager) is preferably slightly less than the theoretical bandwidth or data rate available. For example, when the router makes a value of the bandwidth available over a wireless channel, this can be reduced (either by the router or by the QoS Service Manager) by, for example, anything from 10% below to 10% of the theoretical rate available. Similarly, embodiments in which an electrical power-line is used as a communications link, for example, a connection between a device and an Ethernet interface on the router device 18, may require adjustment of the actual bandwidth to a lower value to allow for a safety margin.

A broadband access link may be provided using a copper, cable, optical, or wireless (e.g. 3G, WiMax, etc,) link.

A new service session request may be intercepted by a service request interceptor to determine its resource requirement, whereby the determined resource requirement is forwarded by the service request interceptor in a service session resource reservation request to said service request processor.

The service session resource manager may further comprise means to cause an error message to be sent to one of said one or more clients if it is determined from said resource utilisation indicator there is insufficient resource for a new service session requested by said one of said one or more clients.

If it is determined from said resource utilisation indicator that there is sufficient resource for the new service session requested by one of said one or more client terminals configured to send service requests over said communications line without requesting access to the service from said service session manager, said service session resource manager may reserve resources for said new service session.

The error message may indicate one or more existing sessions using said resource over said communications line.

The client terminal receiving said error message may further request session preference information to be provided by a user of the terminal to indicate if the new service session or one or more indicated existing service sessions is preferred by the user, wherein responsive to said session preference information being communicated to said service session resource manager, said service session resource manager reserves resources in accordance with said session preference information.

If said session preference information indicates a user preference for the new service session over an existing service session, session preference information identifying said existing service session may be communicated to a router or to an external data source or remote access server at the server end of said communications line, wherein said router or external data source or remote access server modifies the existing service session and/or terminates said service session in accordance with said user preference information.

The existing service session may be modified to increase or reduce a reserved resource used by the existing service session identified in said session preference information.

The existing service session identified in said session preference information may be terminated. The resource may comprise bandwidth over said communications line.

A service session may be for a data stream. The data stream may comprise audio and/or video content data. In principle this could be extended to non-audio/video traffic e.g. VPN traffic in a homeworker environment.

The service session manager may comprise a UPnP-enabled quality of service (QoS) service manager and said current resource utilisation indicator may be updated by said service request processor to indicate a resource used by one or more service sessions established by one or more client terminals not supporting UPnP quality of service service management which are configured to send service requests over said communications line without requesting access to the service from said UPnP-enabled quality of service service manager.

Another aspect of the invention comprises a method of service session resource management in a router capable of routing a plurality of service sessions between a plurality of client terminals over a communications line, the method comprising: storing a current resource utilisation indicator for a resource of said communications line; processing a new service session request from one of said plurality of client terminals to determine a required resource for said new service session over said communications line; determining if resources are available for said requested service session in dependence on an available line rate and said current utilisation indicator; reserving the required resource; updating said current utilisation indicator to indicate the allowed resource reservation; and responding to said client that said resources have been reserved, wherein the method further comprises: updating said current resource utilisation indicator to indicate a resource used by one or more service sessions established by one or more client terminals configured to send service requests over said communications line without requesting access to the service from said service session manager.

Another aspect of the invention comprises a router for a local communications network comprising a plurality of client terminals, the router including a service session resource manager according to an above aspect of the invention.

The router may further comprise: a plurality of user ports, each port for connection to a said client terminal, an external connection port; switching means for transmitting data, and requests for data, between the ports, and said external connection port; a line speed checker; and one or more data processors arranged to implement said service session resource manager and arranged for processing service session data requests received at each port and to select which service session requests are to be forwarded to the external connection port.

One or more of the user ports may have an associated service request interceptor, the associated service request interceptor having: terminal identification means for identifying a user terminal attached to a respective one of said one or more user ports; interception means for intercepting service session data requests received at said one or more user ports and any response data generated by the service session resource manager; data adaptation means for adapting any said response data generated by the service session resource manager; transmission means to forward the adapted response data to the user terminal connected to the port, wherein the router is further configured to update said current resource utilisation indicator of said service session resource manager to indicate a resource used by one or more intercepted service session data requests.

Another aspect of the invention relates to: a router for a local communications network having: a plurality of user ports for connection to a plurality of user terminals, switching means for transmitting data, and requests for data, between the ports and an external connection port, and a mediation processor having: a request processor to process data requests received at each port and select which data requests are to be forwarded to the external connection port, and a response processor to return response data relating to the data requests to the respective port from which the request was received; wherein one or more of the user ports has an associated service request interceptor, the associated service request interceptor having: terminal identification means for identifying a user terminal attached to the user port, interception means for intercepting data requests received at the port, and response data generated by the mediation processor, data adaptation means for generating response data adapted to the user terminal connected to the port.

The associated service request interceptor acts as a proxy, allowing "legacy" user terminals not equipped with the mediation tools to co-operate in the negotiation for bandwidth. In particular, it may allow the router to be informed of the bandwidth required by the device, or of any priority it should be given (for example by identification of the data requested, or by a user-generated password allowing one user to be given priority in mediating requests for data. The service request interceptor may also generate data in a form suitable for display on the user device, for example to inform the user why a data request has been refused or an existing data stream is to be terminated, to cause any necessary disconnection to take place in a "graceful" manner.

The service request interceptor may also be arranged to resubmit a request that has been previously refused or interrupted when demand for bandwidth reduces to a level where the request can be accommodated, for example, by prompting the client to resubmit a previously rejected request which the SRI then intercepts and forwards to the QoS service manager.

Another aspect of the invention seeks to provide a service session resource mediator for a communications line used by both resource mediation enabled client terminals and resource mediation non-enabled client terminals, the resource mediator comprising: means to receive service session resource requests; means to determine availability of a requested resource; means to respond to a received service session resource request to indicate said request is granted; wherein said means to determine availability of a requested resource includes a determination of the resource utilisation by services requested by both resource mediation enabled and non-resource mediation enabled client terminals.

The invention therefore is capable of providing a non-UPnP QoS Service Management supporting client terminal with information on other service sessions using resources which have prevented an service request from the client terminal from being accepted, the method by intercepting the service request from the client terminal; generating a request identifier for the service request; and generating a traffic descriptor for said requested service; forwarding said traffic descriptor for the service request to an extended UPnP QoS Service Manager; receiving a reject message from said extended UPnP QoS Service Manager which includes error information including information identifying said other service sessions and said traffic descriptor; determining the request identifier for said reject request from said traffic descriptor; storing the error information in association with the determined request identifier; generating a redirect message including said request identifier and the address of a web-server arranged to dynamically generate error information; sending the redirect message to said client terminal. At the client terminal, in response to receipt of a said redirect message, an HTTP request is directed to said web-server which includes said request identifier. The web-server which receives said HTTP request, including said request identifier, processes the HTTP request: by extracting said request identifier; generating a request for error information including the extracted request identifier; sending said request to said service request interceptor; receiving error information retrieved by said service request interceptor locating said error information using said request identifier; and generating a web-page containing said error information, whereby the client terminal displays said web-page so generated.

The aspects and embodiments of the invention are as set out herein above and in the accompanying independent and dependent claims, which may be combined in any manner apparent to one of ordinary skill in the art.

A quality of service condition may comprise one or more of: a predetermined range of latency, variable delay, encoding quality, colour saturation, perceived mean opinion score on image quality or the like.

The resource may comprise one or more of the following: bandwidth over a broadband access line to an access point via which the client terminal is provided with access to said broadband line; bandwidth over a communications channel to the service requesting device on a wired or wireless path between the service requesting device and an access point via which the client terminal is provided with access to a broadband line; bandwidth over a communications channel to the service requesting device on a wired or wireless path between the service requesting device and a service-providing one of said plurality of client terminals arranged to provide said requested service; bandwidth over a communications channel to a service providing device on a wired or wireless path between the service requesting device and said service-providing device.

BRIEF DESCRIPTION OF THE DRAWINGS

Embodiments of the invention will now be described with reference to the accompanying figures which are by way of example only and in which:

FIG. 9 shows the flow of messages for resource reservation and subsequent refresh for an embodiment of the invention;

The best mode of the invention as currently contemplated by the inventors will now be described with reference to the accompanying drawings.

DETAILED DESCRIPTION OF PRESENT EXAMPLE EMBODIMENTS

Figure 1:
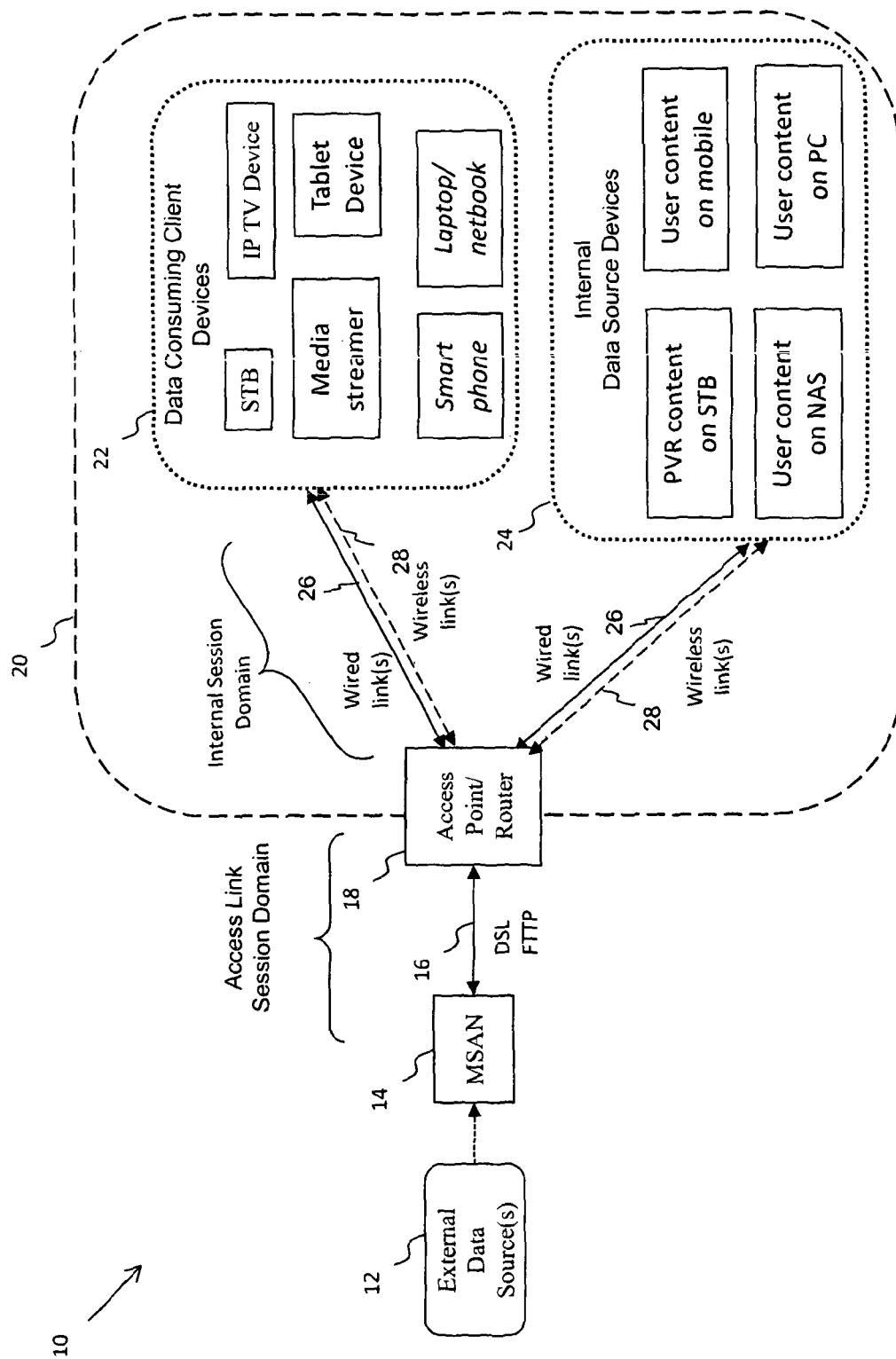
FIG. 1 is a schematic depiction of a communications system in which content data is consumed by a plurality of different devices within a local area network.
Figure 2:
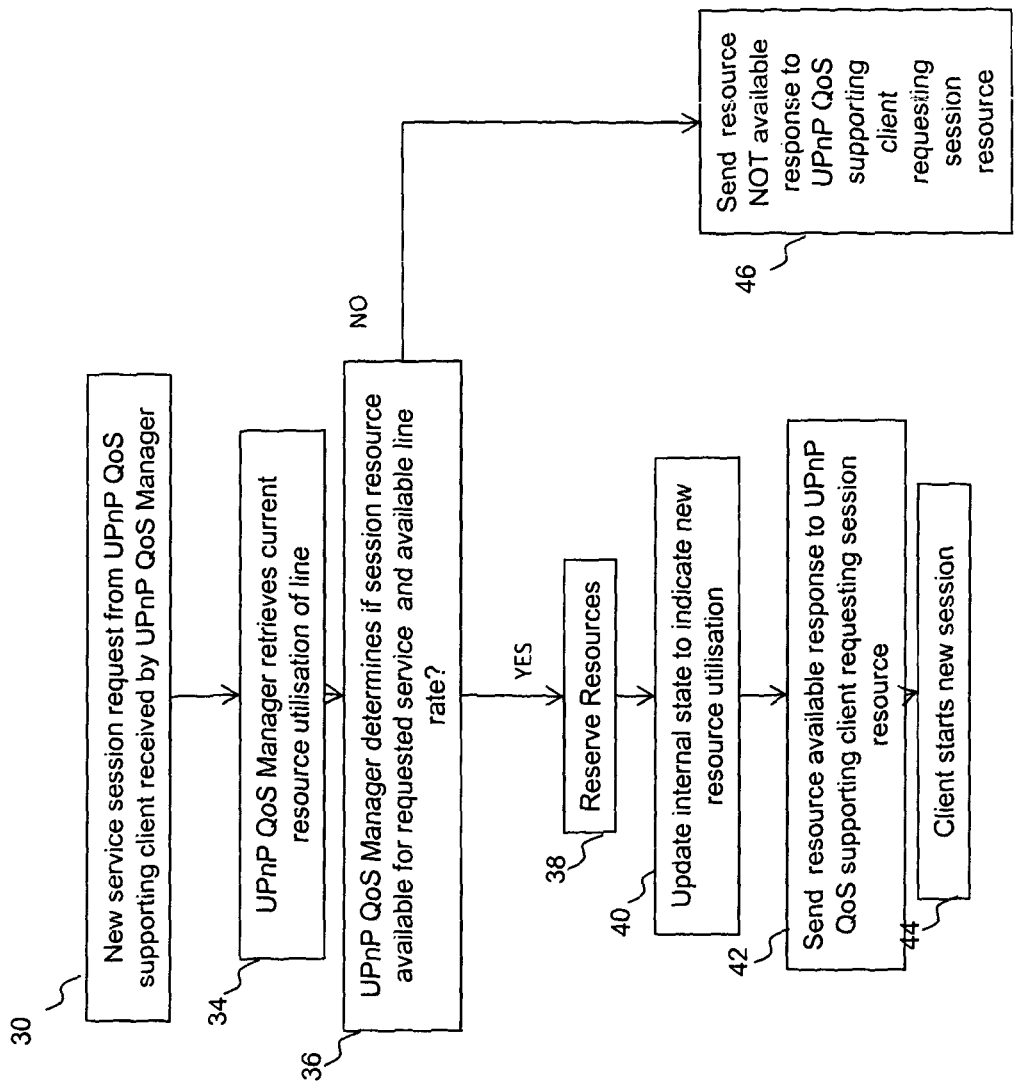
FIG. 2 is a flow diagram showing steps in a method of implementing UPnP QoS Service Management in a router shown in the local area network of FIG. 1.
Figure 3:
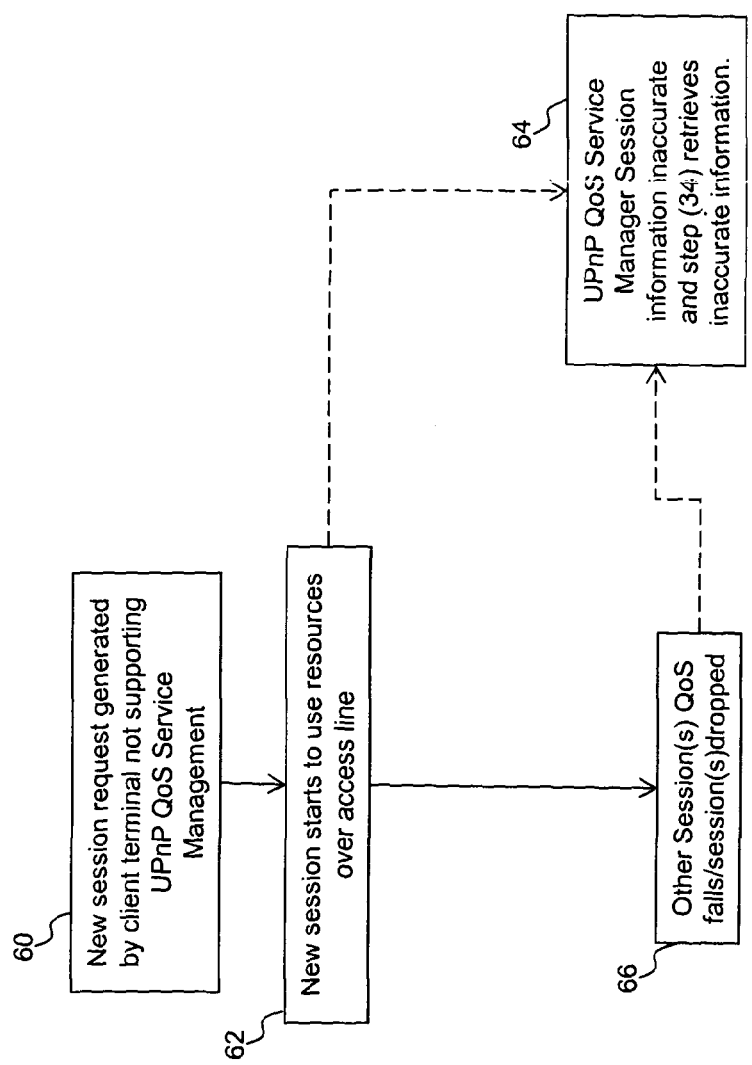
FIG. 3 is a schematic depiction of the impact of a session generated by a client terminal not supporting UPnP QoS Service Management on the method shown in FIG. 2.
Figure 4:
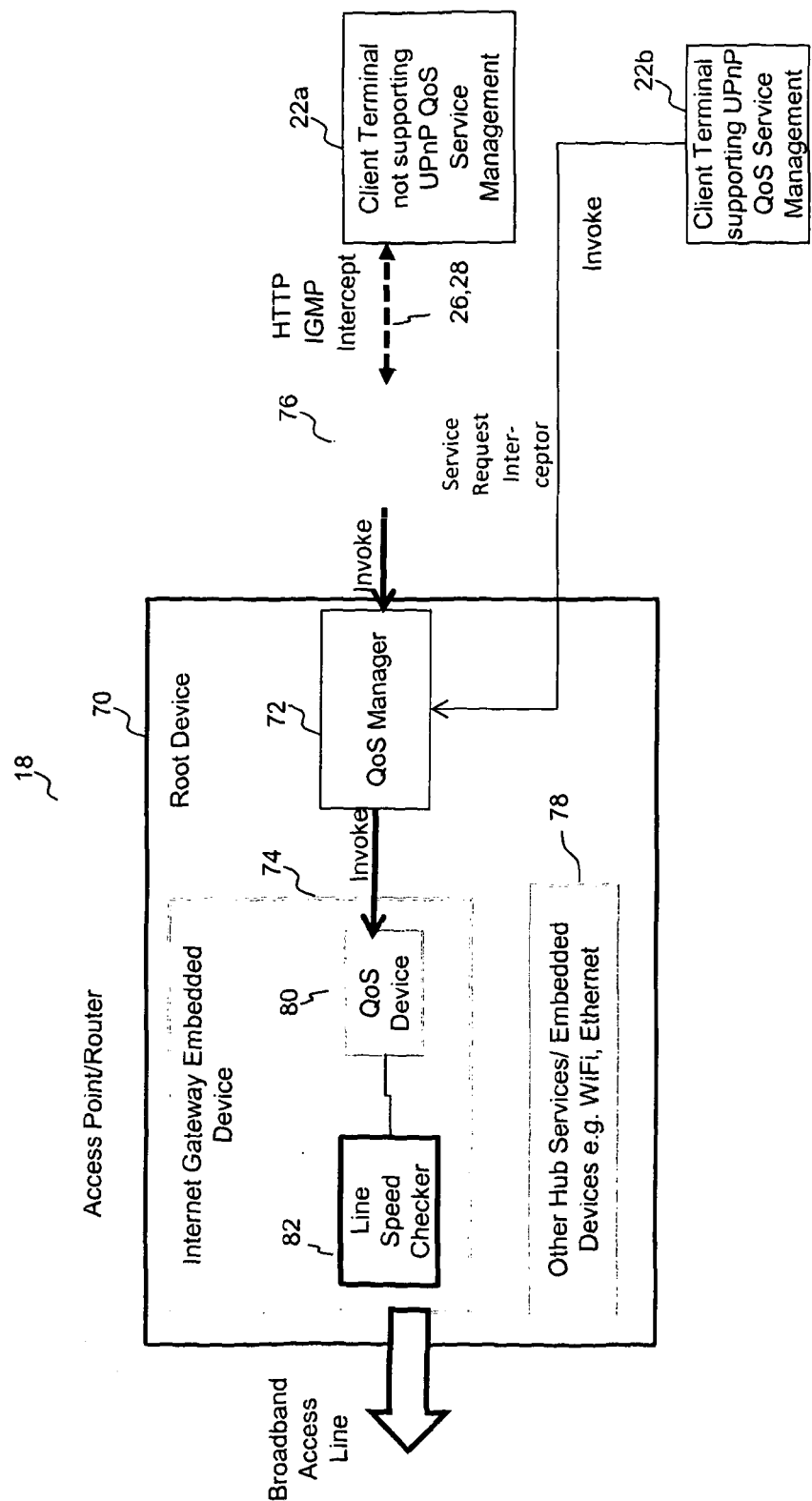
FIG. 4 is a schematic depiction of a router including a service session resource manager according to an embodiment of the invention together with a plurality of user devices co-operating therewith.

FIG. 4 shows an access point/router 18 according to an embodiment of the invention in which the functionality of a router is associated with the functionality provided by an access point to a broadband access line 16 as shown in FIG. 1. Alternatively, a separate access point and router may be used to implement the invention. The access point/router functionality shall be referred to herein by the term "router" hereinafter unless the context indicates otherwise.

As shown in FIG. 4, router 18 includes a root device 70 comprising means to reserve resources for maintaining the QoS of service sessions established over an external port (not shown) connected to broadband access line 16. Root device 70 includes a number of embedded devices 72, 74 configured to support various services and bandwidth mediator means arranged to mediate between concurrent service session requests competing for bandwidth over the access line to manage the quality of service of the requested service sessions. The mediator means is implemented by using a service session resource or Quality of Service (QoS) manager 72, for example, a service session resource manager such as an UPnP QoS service manager as shown in FIG. 4.

QoS Manager 72 (also referred to herein equivalently as a resource manager or QoS service Manager or UQoSM) conventionally comprises components generally conforming to the Third Version of the UPnP QoS Manager Device Control Protocol (DCP) standards entitled UnP QoSManager:3 Service Template Version 1.01 for UPnP Version 1.0, dated Nov. 30, 2008, the contents of which are incorporated in their entirety by reference into this description, and which, at the time of writing, is available to download from http://www.upnp.org/specs/qos/UPnP-qos-QosManager-v3-Service.pdf which is conventionally deployed in an architecture conforming to the Third Version of the UPnP QoS Architecture DCP standards entitled "UPnP-QoS Architecture:3 For UPnP Version 1.0", Status: Standardized DCP, Date: Nov. 30, 2008, the contents of which are incorporated in their entirety by reference into this description, and which, at the time of writing, is available to download from http://www.upnp.org/specs/qos/UPnP-qos-Architecture-v3.pdf.

According to the invention the UQoSM 72 is arranged to receive QoS service requests from a service request interceptor (SRI) 76 also using standard UPnP QoS v3 protocol information in addition to or instead of receiving requests from UPnP QoS service management enabled client terminals 22b. The SRI 76 intercepts service requests generated by client terminals 22a (or 24a if such data-provided terminals are at this point functioning as a client terminal receiving data) which have no capability of using the UPnP QoS Service Management protocol generally (or specifically version 3 if the client terminal is to receive information back on competing service sessions). The SRI processes intercepted requests to determine sufficient information to generate a service request compliant with the version of the UPnP QoS Service Management communications protocol the UQoSM 72 is operating under in order to ensure the requirement for one or more predetermined delivery conditions are met, for example, for a predetermined level of QoS to be provided according to the invention when fulfilling the service request.

The SRI 76 determines the resources which are required, such as bandwidth, and by providing this information to the UQoSM 76, the state of resource utilisation internally stored by the UQoSM 72, for example, the bandwidth resource utilisation over broadband communications access 16 line (or any internal channel) is updated by the UQoSM 72.

In this way, UQoSM 72 updates its internal state both as a result of the UQoSM 72 receiving service requests from any UPnP QoS service management supporting client terminals 22b (also referred to herein as "mediating client terminals") for which it reserves resources such as bandwidth, and, as a result of the service request interceptor (SRI) 76 generating requests for non-mediating client terminals 22a. SRI 76 does this by monitoring a plurality of ports (not shown) on router 18 which face client terminals 22, 24 and by intercepting service requests which conform to predetermined interception criteria (which may change dynamically in certain circumstances, see later herein below 0. The requests intercepted are from client terminals 22a which do not support the UPnP QoS Service Management provided by QoS Service Manager 72. Client terminals 22a not supporting UPnP QoS Service Management is also referred to herein as "non-UPnP QoS Service Management supporting client terminals" or non-mediating client terminals.

As mentioned above, although reference is made herein to client terminals 22a,b comprising user terminals which consume content, the internal content source devices 24 shown in FIG. 1 may also comprise such content consuming devices 22a,b.

The SRI is preferably configured to only intercept requests for so called premium content services which comprise services for which the packets in the data stream provided in response to the service request being accepted would have a packet priority class above best efforts for data forwarding purposes. Such services are also known as "premium bandwidth" service, as they use bandwidth resolvable for packets which have a priority class above best efforts for data forwarding purposes.

Some non-premium bandwidth requests are eliminated from the intercept process by virtue of not having a destination IP address which matches a destination IP address for a premium bandwidth service server. Where a destination IP address is recognised, the HTTP request carried as payload within the TCP packet is also examined using some suitable mechanism, for example, through deep-packet inspection. If the HTTP request contains a universal resource locator for the data requested which corresponds to a premium bandwidth service the HTTP request is intercepted by the SRI 76. If, however, the HTTP request relates to another service available from the same destination address which is not a premium bandwidth service in that it requires merely best-efforts packet forwarding for the data requested, the service request intercepted is released by the SRI to be forwarded on to its destination.

As shown in FIG. 4, QoS Service Manager 72 is arranged to invoke a QoS Device Service 80 in an Internet Gateway Embedded Device 74 in response to receiving a service session request from a client terminal 22b which supports UPnP QoS service management.

The service request interceptor (SRI) 76 monitors a plurality of ports on the router 18 which face local network 20 from which client terminals 22a,b generate service requests. Service requests from a client terminal 22b pass through SRI 76 without interception to be processed by QoS Service Manager 72. However, when a service request from a client terminal 22a is received on a port monitored by the SRI 76, the service request is intercepted. If it is determined that the request for a service that will be delivered using premium bandwidth, the SRI 76 does not allow the intercepted service request to be forwarded out over the port which externally faces broadband access line 16 until the QoS Service Manger 72 has indicated sufficient resources are available and has updated its internally stored state of resource utilisation with the resources that the required for the intercepted service request.

The amount of resource utilisation which the QoS Service Manager 72 updates its internal stored state of resource utilisation over broadband access line 16 is determined by the SRI 76 in one embodiment, but may be determined by QoS Service Manager 72 in others. For example, each intercepted service request for a content stream generated by client terminal 22a is analysed to determine its resource requirements (such as, for example, it's forwarding class, priority, and bandwidth requirements). One way of determining resource requirements is to identify the type of media characteristics associated with a requested content stream. If the content stream requested comprises a standard definition or high definition television channel, for example, the SRI 76 generates a service resource request for that amount of bandwidth from QoS Service Manager 72. This enables QoS Service Manager to determine if the relevant amount of bandwidth is available and if so, to reserve this over the communications line 16. Examples of the types of client terminals 22a which do not support the UPnP QoS Service Management at the present time of writing include, for example, client terminals running a BBC iPlayer, iTunes, Apple™ TV content consuming applications.

In one embodiment of the invention, when a client terminal 22a is first connected to a port on router 18, a client control module identifies the device and generates a service request interceptor application. The role of each SRI application is to intercept HyperText Transport Protocol (HTTP) service requests and Internet Group Management Protocol (IGMP) service requests from client devices 22a not having the mediation capability, such as those which do not support UPnP QoS Service Management if the QoS service session manager 72 comprises a UQoSM 72.

As mentioned above, the HTTP and IGMP service requests are analysed by the SRI application to determine the resources the data delivered in response to the service request from external data source 12 will require over broadband access line 16. Once the broadband access line resource(s) required to fulfil a requested service has been analysed the SRI application invokes the QoS Service Manager 72 with a request to reserve the required resources. QoS Service Manager 72 processes the request to determine if the required resources are available and if so, sends a response to the SRI 76 to allow the service request to be forwarded to its destination. QoS Service Manager 72 then updates its internal data store indicator to indicate the resources which the service request will use over the broadband access line.

For non-UPnP QoS Service Management Supporting client terminals 22a, the SRI 76 must provide details of the bandwidth required to fulfil a given delivery condition to UQoSM 72, so that the UQoSM 72 can reserve resources to maintain a predetermined quality of service, for example, a QoS specified in a delivery or service policy in terms of a requested service being provided within predetermined range of variable delay or latency in the data stream to be delivered to the client terminal.

UQoSM 72 determines if sufficient bandwidth resource is available to fulfil the service request by retrieving the current available line speed over the broadband access line 16 either from memory or by dynamically querying a line speed checker 82. The UQoSM 72 functions as a QoS and resource manager in that it determines if the available line speed can support the additional bandwidth resource required to fulfil the service request by determining if the additional bandwidth resource required exceeds the bandwidth resource available as determined by subtracting the total resource utilisation indicator for utilisation of bandwidth over the broadband access line stored in its internal memory from the line currently available line rate.

If sufficient bandwidth is available, the service request is granted. The UQoSM 72 reserves the required resources so that a level of QoS in accordance with the resource requirement sent by the SRI 76 can be maintained. The UQoSM 72 updates its internal state and sends a response back to the client terminal 22b or SRI 76 as appropriate.

If sufficient bandwidth is not available, the service request is denied. The UQoSM 76 sends a response back indicating the request is rejected. The SRI 76 then processes the request and generates an appropriate error message in the communications protocol used by client terminal 22a to generate the service request (e.g. an HTTP error message is sent to the client terminal if this has used HTTP to generate the service request, and an IGMP error message is sent if this communications protocol was used to generate the service request).

The cause of the service request rejection by the QoS Service Manager 72 may be indicated in the reject message it generates. The service denial may be indicated as due to the line rate being insufficient or due to other services on the line. The SRI 76 may include this information in the error message it generates for transmission to the client in a format appropriate to the device type. If bandwidth is unavailable, the QoS Service Manager supplies details of on-going sessions so that the client terminals 22a and/or client terminals 22b can display an appropriate message to users in one embodiment of the embodiment.

In this way, by providing a SRI 76 to intercepts IMGP and HTTP service requests from client terminals 22*a* which themselves do not have the capability to negotiate resources to fulfil the service requests they generate, QoS Service Manager 72 is able to successfully monitor bandwidth utilisation of the broadband access line and is able to mediate between the bandwidth requirements of data streams over broadband access line 16 to both types of client terminals 22*a,b* located within local network 20. This means that even when a plurality of service sessions having the same data forwarding class (i.e., whose packets have the same priority level over the broadband access line) are running at least in part contemporaneously, a bandwidth resource mediation policy can be implemented by the UQoSM 72 to maintain a relatively good QoS for all service sessions allowed.

Figure 5A:
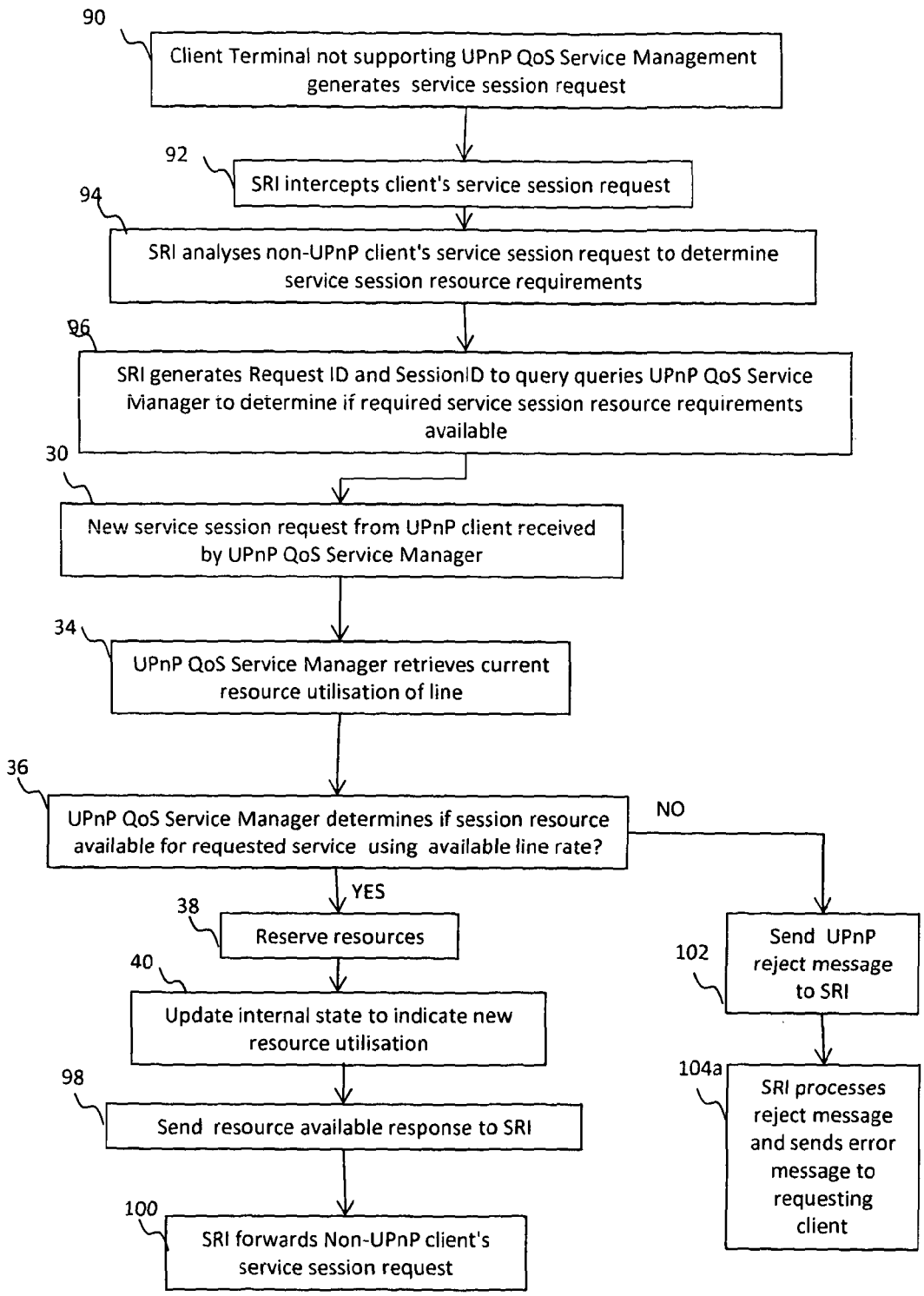
FIG. 5a is a flow diagram showing steps in a method of implementing service session resource management according to an embodiment of the invention.

Turning now to FIG. 5*a*, steps in a method of service session resource management according to an embodiment of the invention are shown in which non-mediation enabled client terminal 22*a*, shown here as a client terminal 22*a* which does not support UPnP QoS service management, generates a service session request (step 90). The request is generated using HTTP or IGMP or some other suitable communications protocol in order for client terminal 22*a* to receive a data stream over broadband access line 16. SRI 92 intercepts the service session request (step 92).

Figure 8:
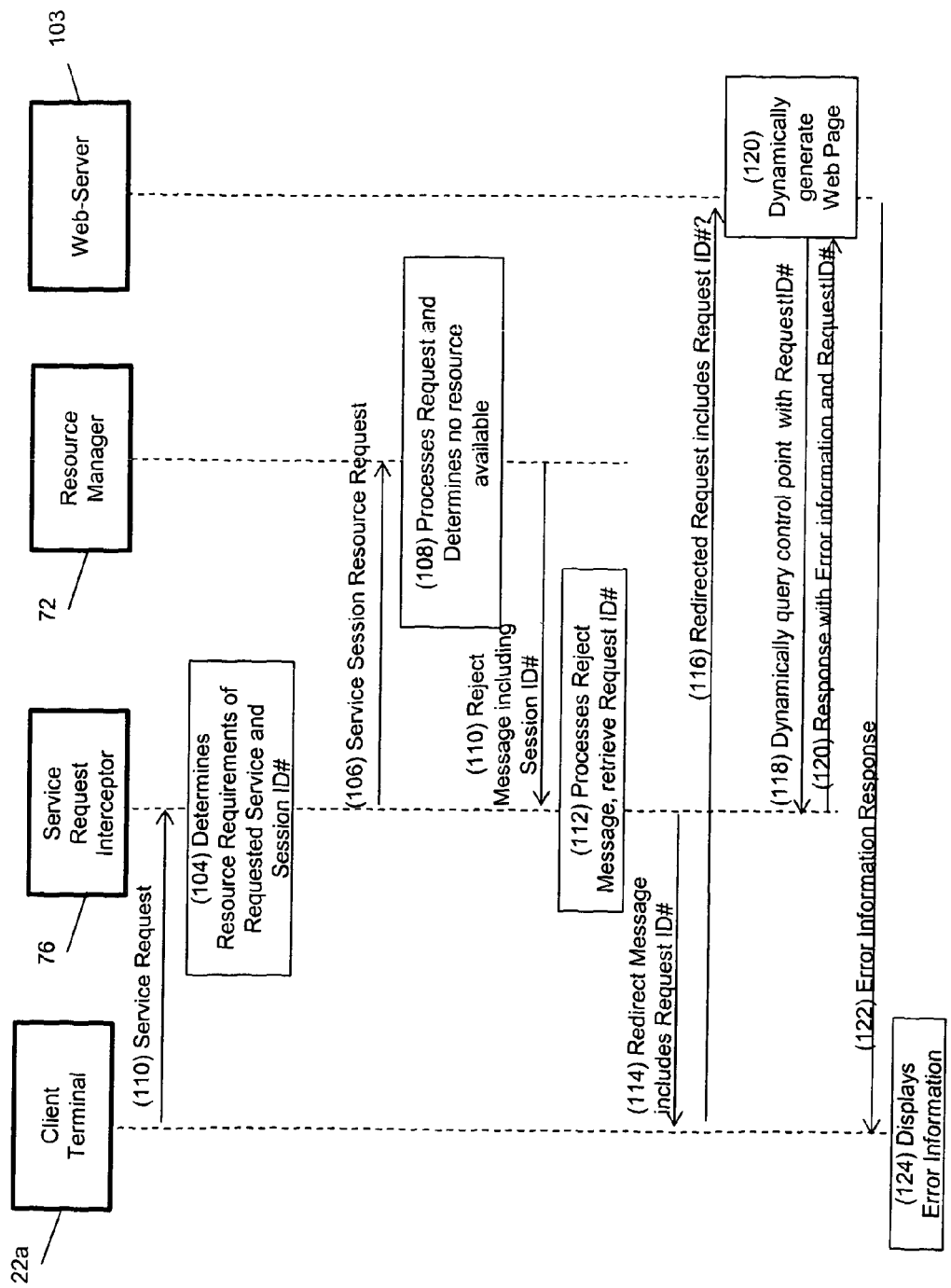
FIG. 8 shows in more detail how an HTTP redirect is implemented to communicate a service request being denied access by the UPnP QoS service manager in the embodiment of the invention shown in FIG. 5b.

Turning now briefly to FIG. 8 of the accompanying drawings, the criteria used by the SRI 76 to intercept the service session request message will now be described. FIG. 8 shows how error messages are handled for the embodiment of the invention shown in FIG. 5*b* where a HTTP redirect is generated to enable the client terminal to receive some error information when its service request is dropped at the point after interception by the Service request interceptor (SRI) 76. As shown in FIG. 8, client terminal 22*a* generates a service request. Packets which have an IP destination address known to be a particular content source server address are intercepted by the SRI 76. The SRI 76 then examines the contents of the packets to determine they comprise and HTTP request for a particular Universal Resource Locator (URL). The resource requirements are determined using the URL which conforms to a naming convention so that the URL itself is associated with bandwidth requirements or alternatively, can be determined using meta-data or tagged information such as FIG. 12 describes. The information on bandwidth required to satisfy one or more levels of QoS for a given URL is stored either locally on the router 18 so it can be locally retrieved by SRI 76 or, if stored remotely on some suitable data server, SRI 76 is configured to remotely retrieve the bandwidth (and any other information providing the resource requirements needed to maintain a given QoS for the content to be delivered) from the relevant data server. A basic data retrieval operation uses the URL from the request (or the multicast address of an IGMP request) as a search index, for example, a look-up operation, which then retrieve the resource requirements for the given URL from the corresponding data record/entry.

As mentioned above, this requires the URL to correspond to naming convention in which the URL itself indicates the relevant resource requirement for the traffic stream requested (or from which the requirements can be determined by reference to data record using the URL). Whilst the resources are likely to be retrieved, in some instances it may be possible for the SRI 76 to calculate them based on information retrieved. For example, if the URL corresponds to a content stream for a high definition VoD or a high definition linear TV service, the SRI can calculate the required bandwidth to maintain an agreed QoS for the high-priority packet forwarding class associated with that stream over the broadband access line to the router 18 (and also internally, if the session is from an internal content source for which an IP address has been allocated which triggers the interception process).

A means to subsequently identify the traffic stream to be delivered in response to the service request being accepted in the form of a session identifier or the like is also generated by the SRI in order to be included in the service resource request it sends to the QoS Service Manager 72. A session identifier may comprise a RequestTrafficQoS( ) conforming to the required UPnP QoS Service Management standard format. A RequestTrafficQoS( ) message has one parameter which is an InitialTrafficDescriptor. The InitialTrafficDescriptor includes a TrafficId (which comprises Source address, source port, Destination address, destination port and IP protocol) and an AvailableOrderedTspecList (which contains one or more Traffic Specifications (Tspecs), A Tspec specifies the bandwidth required. Thus, by generating a Tspec for the non-UPNP QoS client terminal 22*a*, which the QoS Service Manager can then use, the SRI effectively ensures that the UQoSM operates more efficiently for UPnP Service supporting client terminals as well as for enabling non QoS client terminals to experience a level of QoS as determined by the parameters passed to the service request interceptor 76 based on the multi-cast IGMP address used or the specific URL from which a content stream is being requested. Advantageously, this means that content distributors can provide a QoS maintained service to all devices, and not just those devices which are preconfigured to implement UPnP QoS Service Management.

Returning now to FIG. 5*a*, the SRI 76 analyses the resources required to send the requested data stream over the broadband access line 16 (step 94) as described in more detail herein below. The SRI 76 will determine from the resources required a suitable session identifier which is communicated to the QoS Manager 72, and in some embodiments will also generate a RequestID to facilitate reporting error information to the client terminal if the request is rejected by a QoS Manager 72. The SRI 76 then queries the QoS Manager 72 with the relevant session information, having created a data record associating the session identifier (or alternatively traffic stream characteristics) with the request identifier by generating a service session resource reservation request.

A QoS Manager 72 comprises here a resource mediating service session resource manager 72, shown here as a UPnP QoS Service Manager (also referred to as a UPnP QoS Manager (UQoSM)) (step 96), preferably of the type which implements the latest UPnP QoS service management standard, currently version three. The service session resource reservation request preferably comprises a QM: RequestExtendedTrafficQos( ) type of message which includes means to identify the traffic stream of the service request. For example, a QM:RequestExtendedTrafficQos( ) includes a TrafficId (which may include a source address, source port, destination address, and destination port), and one or more traffic specification (TSpecs) which specify bandwidth preferences for the traffic stream requested.

In step 94, the SRI determines the bandwidth required and includes this in the traffic specification in the service session resource reservation request which is sent to the UPnP QoS Manager (UQoSM) 72. UQoSM 72 receives the service session resource reservation request and processes it to determine if the resource required, for example, the bandwidth required is available (step 30) and any other information to be returned to SRI 76.

The UQoSM 72 invokes a UPnP Service QoS Device 80 to determine the current line rate, for example, the Qos Device 80 may query a line speed checker 82 dynamically or retrieve a previously stored value from memory to which the line speed checker may push line speed updates (step 32). The UQoSM 72 then determines the current resource utilisation of the line from its internal state record (step 34), and determines the bandwidth available of the line is sufficient by comparing the bandwidth requested with the line speed less the current resource utilisation indicated by its internal state data record. If there is not enough bandwidth, the UQoSM 72 sends a UPnP reject message to the SRI 76 (step 102), which then adapts the reject message contents to a form suitable for returning to the service requesting client terminal 22a (step 104a), and the service request is dropped. If the original service request comprised an IGMP service request, no error message is communicated back to the client terminal.

Figure 5B:
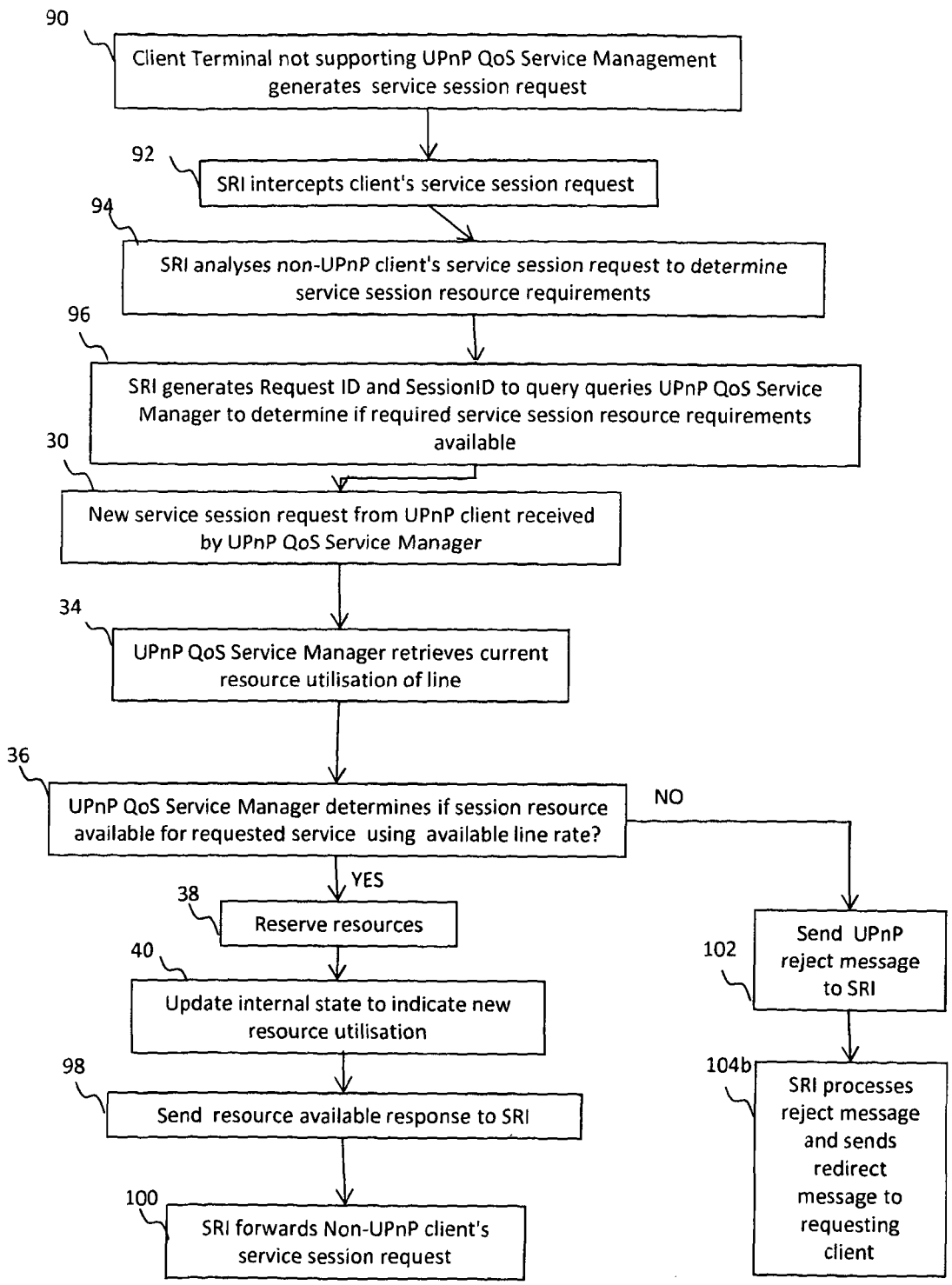
FIG. 5b is a flow diagram showing steps in a method of implementing service session resource management according to an alternative embodiment of the invention.

FIG. 5b shows an alternative way of communicating error information to a client terminal in which an HTTP service request was originally generated by a client terminal in which the SRI 76 sends an HTTP redirect message back to the requesting client terminal (step 104b) when it drops the client's service request. This enables the client terminal to determine information on other service sessions using resources over said access line and/or internally within LAN 20.

If, however, the UQoSM 72 determines there are sufficient bandwidth resources for the service session requested to not adversely impact any existing service sessions, it reserves the resources (step 38). The UPnP QoS service Manager 72 will normally consider the impact the new service will have on sessions having the same data forwarding class and/or packet prioritisation level, so that, for example, competing sessions in the same data forwarding class and/or having the same packet prioritisation level are appropriately mediated as these otherwise have equivalent ranking for the resource. The UQoSM then updates its internal state to indicate the new resource utilisation (step 40), and indicates to the SRI that the resource is available (step 98) so that the SRI 76 forwards the service session request to its external destination (step 100).

Such a resource manager requires the ICT 76 to send a service session resource request in the form of a Request-TrafficQoSExtended( ) message (i.e., one which conforms to the V3 standard). This has the same parameter value as the RequestTrafficQos( ) message of earlier standards, which is an InitialTrafficDescriptor, but more information is generated and returned by the QoS Manager in response, for example, a list of blocking sessions may be returned if the request is rejected. The InitialTrafficDescriptor includes a TrafficID (which comprises Source Address (SA), source port (on the router 18), Destination Address, destination port (on the router 18) and IP protocol), a AvailableOrderedTspecList (which contains one or more TSpecs), A Tspec will specify the bandwidth required. Whilst all traffic identifying fields are optional, where the SRI 76 is aware of the information it is preferably to include the information in the TrafficID passed to the QoS Manager 72. The trafficID is created by looking at the relevant flow parameters. The Tspec is created by looking up the bandwidth associated with certain terms in the URL or associated with certain multicast addresses. The lookup may be local if this information has been configured into the router 18 or remote.

The embodiments of the invention thus enable a UQoSM 72 to receive an indication of resource requirements such as the required bandwidth for a traffic stream which is requested by a non-UPnP QoS Service Management supporting client terminals as the SRI 76 determines the bandwidth from the URL structure.

Figure 6:
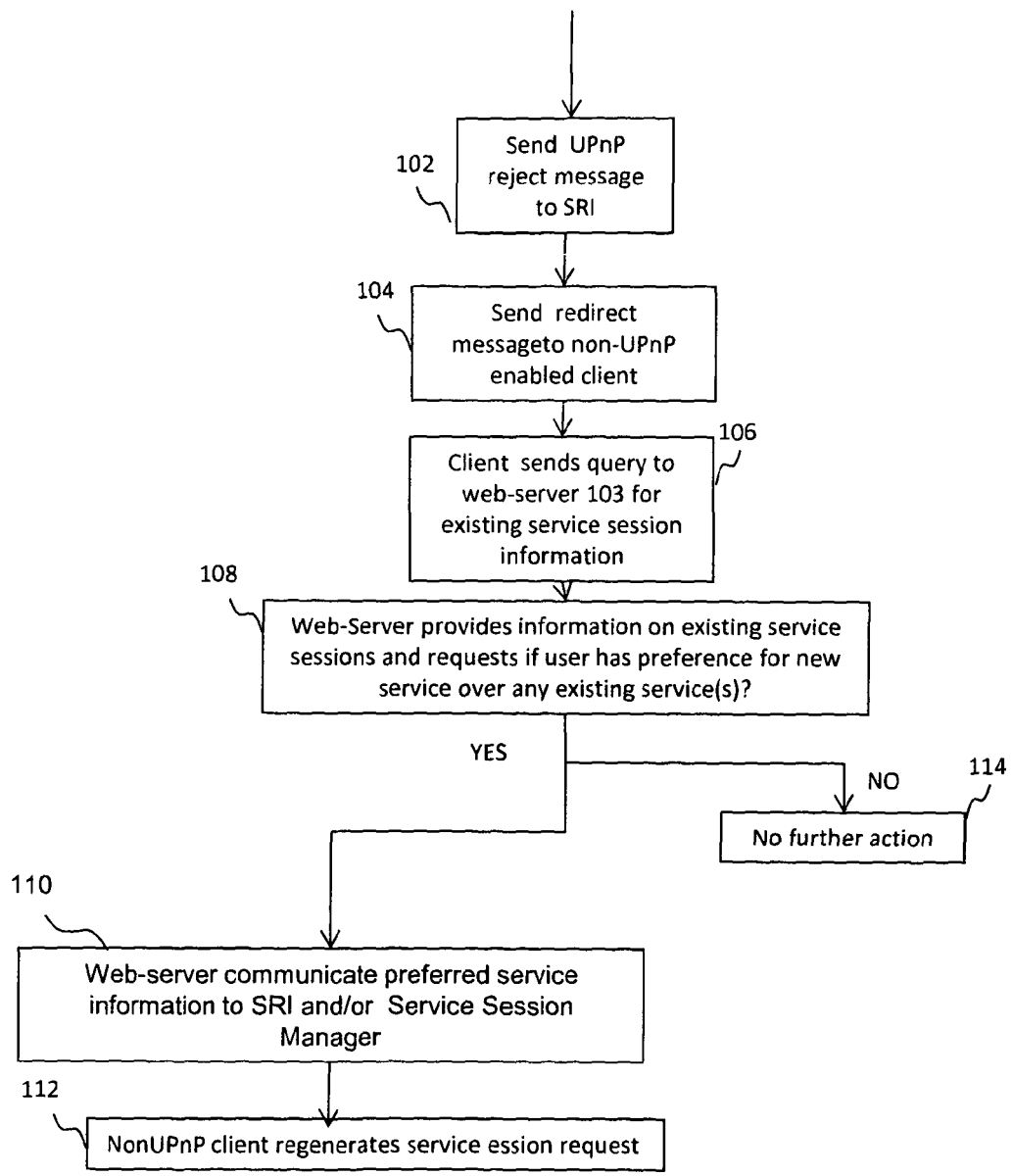
FIG. 6 is a flow diagram showing the additional steps in performed in a method of implementing service session resource management according to another embodiment of the invention.

FIG. 6 shows an extension of the method shown in FIG. 5b which follows on from steps 102, and 104 In FIG. 6, responsive to an HTTP redirect message being received (step 104) the client terminal 22a sends a query to a remote web-server 103 (step 106) and receives information from a remote web-server 103 (see FIG. 8) identifying other service sessions which are using resources and blocking service request generated by the client terminal 22a (step 108). As shown in FIG. 6, this information is displayed on the service requesting client terminal 22a to enable input from a user of the client terminal 22a to indicate a preference for the new service over any of the existing services. If the user indicates negatively, not further action is taken (step 114). Accordingly, building on from step 104b in FIG. 5b, a list of blocking sessions is returned and presents the user with the option of terminating one of those sessions. There is then an interaction between the user and the web server 103 and the client terminal 22a uses a web browser to enable these HTTP interactions to be supporting and so can remain non QoS-aware. For client terminals such as STBs, TVs etc, a web-browser may have limited functionality and comprise a basic application (rather than a web-browser such as, for example, Internet Explorer™ such as would be familiar from a personal computer context).

If, however, the user indicates there is a preference for the new service, the client terminal 22a responds to the web-server 103, which is configured to generate preferred session information which is sent to the SRI 76 which identifies which session is to be terminated and/or which session is to be retained. The SRI then responds to the UQoSM 72 which can then terminate any unwanted session(s) (step 110). Alternatively, the web-server 103 may display sufficient information on the alternative sessions for the client terminal or a user of the client terminal to send a request to another device receiving a data stream in a non-preferred service session to terminate that service session or to a remote data source or to the broadband remote access server to terminate the stream. Either way, after a suitable time during which the unwanted service session terminates, the client device 22a regenerates the service session request for the preferred service (step 112).

Accordingly, by providing an SRI which generates a redirect messages responsive to HTTP service requests being rejected, a list of blocking sessions can be returned to the client terminal whose request has been rejected so that a user of the client terminal can be provided with the option of terminating one of the blocking sessions. To support this interaction between the user and the web server 103, the client terminal must provide suitable means for the interaction to be supported, such as a web browser which can support the HTTP interaction. This enables the client terminal 22a to remain non QoS-aware.

The pre-emption mechanism supported by the uPnP QoS v3 communications protocol is for the UQoSM 72 to terminate an existing session as part of the processing of a new request, based on some policy which may or may not involve interaction with the end-user. However, such a policy based approach is not suitable for non-uPnP QoS clients and so a web page approach using the above HTTP redirect which needs the client terminal 22*a* to re-request a new session once the user has terminated the existing session is required.

This can be implemented by re-directing the client terminal back to the original URL following the session termination list page. Or alternatively to display a prompt the user to try again. The client would need to be provided a sufficiently flexible browser to support all the above interactions for this to work.

The RequestId is embedded in redirected HTTP service request by using an agreed convention for the structure of URLs for re-directs, for example, one which includes the RequestId as a parameter. As it is the SRI that both generates the URL and subsequently processes it (as a delegate of the webserver), the convention is established as part of the SRI design.

Figure 7:
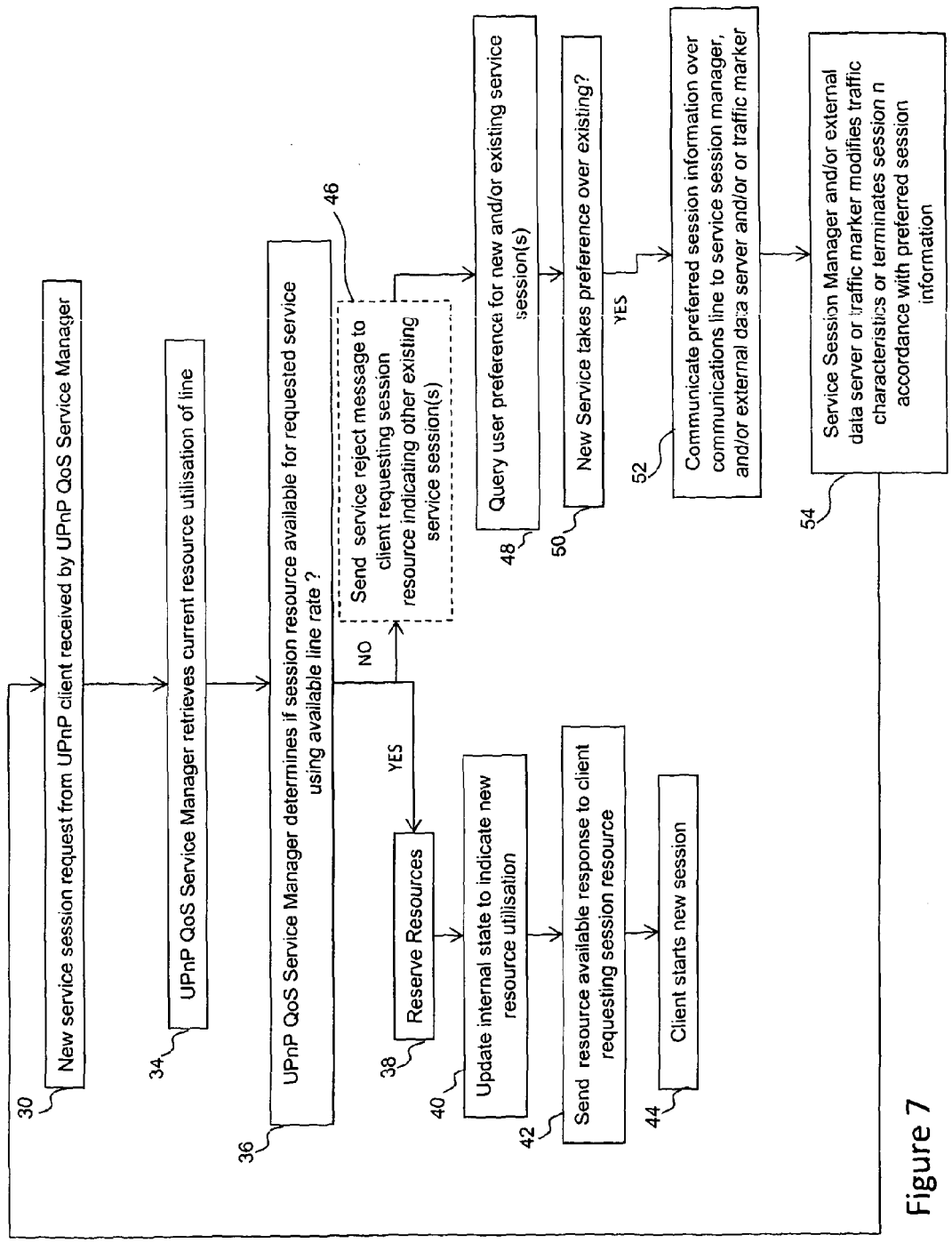
FIG. 7 is a flow diagram showing the steps in performed by a method of implementing service session resource management according to yet another embodiment of the invention.

FIG. 7 of the accompanying drawings shows another embodiment of a method of managing service sessions according to an embodiment of the invention in which a mediating service session resource manager 72, shown as a UPnP QoS Service Manager receives a service session request from a mediation enabled client terminal 22*b*, shown as a UPnP QoS-enabled client terminal (step 30). The UPnP QoS Service Manager (UQoSM) 72 determines the available line rate either by retrieving this from a data store or by querying a line speed checker (step 32). The UPnP QoS Service Manager 72 has awareness of the current resource utilisation of the broadband access line (step 34) and the UQoSM 72 determines if sufficient resources are available for said service request based on the current available line rate and its awareness of the current resource utilisation rate of the line (Step 36). If resources are available, the method proceeds to reserve resources (step 38) and update the internal awareness state of the UQoSM 72 regarding the bandwidth utilisation (step 40), and a suitable response is sent to UPnP QoS-enabled client terminal 22*b* (step 42) after which the session starts 9 step 44). If, however, resources are not available, a UPnP service reject message is sent to client terminal 22*b* (step 46) which includes details of the existing services using resources over the access line 16 concurrent with its receipt of the service request. The client terminal 22*b* in this embodiment is configured to display the other existing sessions and to prompt the user for a preference between the new and/or existing service sessions (step 48). If response indicates the new service takes preference over an existing service session, the preference information is sent to the UQoSM 72 so that this can terminate the non-preferred service session and/or a request is sent to an external data server and/or traffic marker to modify the existing traffic stream's traffic characteristics (for example, to lower its forwarding class and/or packet prioritisation level). The client terminal 22*a* then waits an appropriate amount of time to allow the non-preferred service session to terminate and then regenerates a service session request for the preferred service.

Returning now to FIG. 8 if the resource manager 72 rejects the service request, it will generate a reject message which is returned to the SRI 76 which identifies the traffic stream rejected using a traffic descriptor. The reject message may contain error information which the SRI 76 is configured to communicate to the client terminal, for example, if the rejected request was an extended QoS request then the response may list the traffic streams which are currently occupying resources.

In this case, the SRI generates a redirect message which includes some means of identifying the error information relating to the rejected service session. Examples of an error information identifier include a RequestID to associate the information with the request received which can be generated by the SRI 76 or, alternatively, when a reject message is retrieved a RequestReject ID may be generated by the SRI and used instead. In either case, the SRI 76 includes the information identifier when it generates the redirect message for sending to the client terminal so that error information can be subsequently provided to the client terminal. This means that when the SRI drops the service request, a client terminal acting on the redirect message it receives contacts a data server 103 as indicated in the redirect. When the data server (or equivalently web-server) 103 receives the redirected HTTP request from client terminal 22*a* it dynamically generates a web-page providing details of other sessions which have blocked the request. The information is provided by the error information retrieved by querying the SRI 76 using the information identifier provided by the client terminal in the redirect.

In this case, the SRI generates a redirect message which includes some means of identifying the rejected service session. Although the UPnP QoS Management traffic descriptor could be used for identifying the request to the UQoSM 72, could be used, it is preferable if a simpler data structure is utilised instead. As the request has been rejected, no traffic handle has been generated yet of the kind used for the lease refresh, and so the RequestID stored when the request was generated by the SRI 76 is retrieved using the SessionID (i.e., using a Traffic descriptor) and the RequestID is then sent to the client as part of the redirect message, so that when the SRI drops the service request from the client, the client can be provided with information indicating why the request has been rejected from a web-server 103 which is provided with error information by the SRI 76.

Accordingly, when SRI 76 receives a request reject message, it extracts the relevant error information, such as a list of the blocking traffic streams currently utilising resources over the broadband access line 16 (or if internally, which are occupying internal resources of LAN 20) and stores this in association with the Request ID. SRI 76 then generates a redirect message which is sent to the client terminal 22*a* which includes the RequestID. The client terminal 22*a* then generates a new service request to the redirect URL at web-server 103 which includes the service request's RequestID which the SRI generated. The web-server 103 extracts the RequestID, and dynamically generates the web-page requested by querying the SRI 76 with the requestID. The SRI 76 processes the request for error information from the Web Server 103, extracts the RequestID, and retrieves the relevant error information. The error information in the response sent to the Web Server 103 enables the Web Server 103 to dynamically generate the relevant error information in a web-page which is then displayed on the client terminal.

FIG. 9 of the attached drawings shows how bandwidth reserved by a QoS Manager 72 for a traffic stream requested by a non-QoS supporting client terminal 22*a* is maintained for the duration of the relevant traffic stream. As shown in FIG. 9, SRI 76 intercepts an HTTP or IGMP service request from a non-UPnP QoS Service Management supporting client terminal 22*a*. The appropriate amount of resource required to fulfil the request with a predetermined level of QoS, for example, the bandwidth required for the traffic stream to receive by the client terminal 22*a* with a particular QoS (which may be dependent on the packet priority and/or forwarding class as well as the specific multi-cast address of an IGMP request or URL of an HTTP request) is determined by the SRI 76. The SRI 76 then includes the resource requirements for the required QoS for the requested service when it generates a service session resource request in a conventional UPnP QoS Service Management format. The request generate by SRI 76 also includes means of subsequently identifying the traffic stream requested, for example, it may generate a UPnP QoS Traffic Identifier which comprises a Traffic Descriptor including a traffic specifier (TSpec).

If the QoS Manager 72 accepts the request, it reserves bandwidth, updates its internal state and generates an accept message of the appropriate type which will include a TrafficHandle to allow the resource reservation to be maintained over a period of time exceeding the default lease period after which the QoS manager 72 would automatically release the resources required (a lease may be as short as a few minutes, so that the QoS manager can tidy up on a relatively rapid scale if there are any problems). This Traffic Handle is returned together with the TrafficID and Tspec data and stored locally by the Service Request Interceptor 76.

Once accepted, the SRI 76 forwards the service request to the remote data server 12 which responds with the requested traffic stream. Whilst traffic is streamed to client terminal 22a, the SRI 76 monitors the flow of packets which are routed {out over a monitored?} towards the service requesting client terminal which have a source IP address for the data server known to be associated with a particular traffic stream. The monitoring can be performed using any suitable flow monitoring technique known in the art, such as counting packets.

SRI 76 generates refresh messages which identify each monitored traffic stream (as more than one may be monitored at any given time if a plurality of streams is being received by devices within LAN 20). The refresh resource reservation messages sent to QoS Service Manager 72 comprise UpdateTrafficQoSExtended( ) messages in accordance with the current version of the UPnP QoS Service Management standards which include the Traffic Handle which is returned by the QoS Manager in response to the original RequestTrafficQoS( ) message being accepted. This is necessary as reservations in UPnP-QoS v3 results in finite network resource(s) being allocated for a particular traffic stream, which if no longer required must be freed so other streams or applications can use the resources. If a timer expires with no explicit release of the reservation having been received with the lease period of time, it is assumed that the reservation is no longer needed and the reservation and resources are released. To extend the lease period of time, the UpdateTrafficQoSExtended( ) message is sent to the QoS Service Manager 72.

Figure 10A:
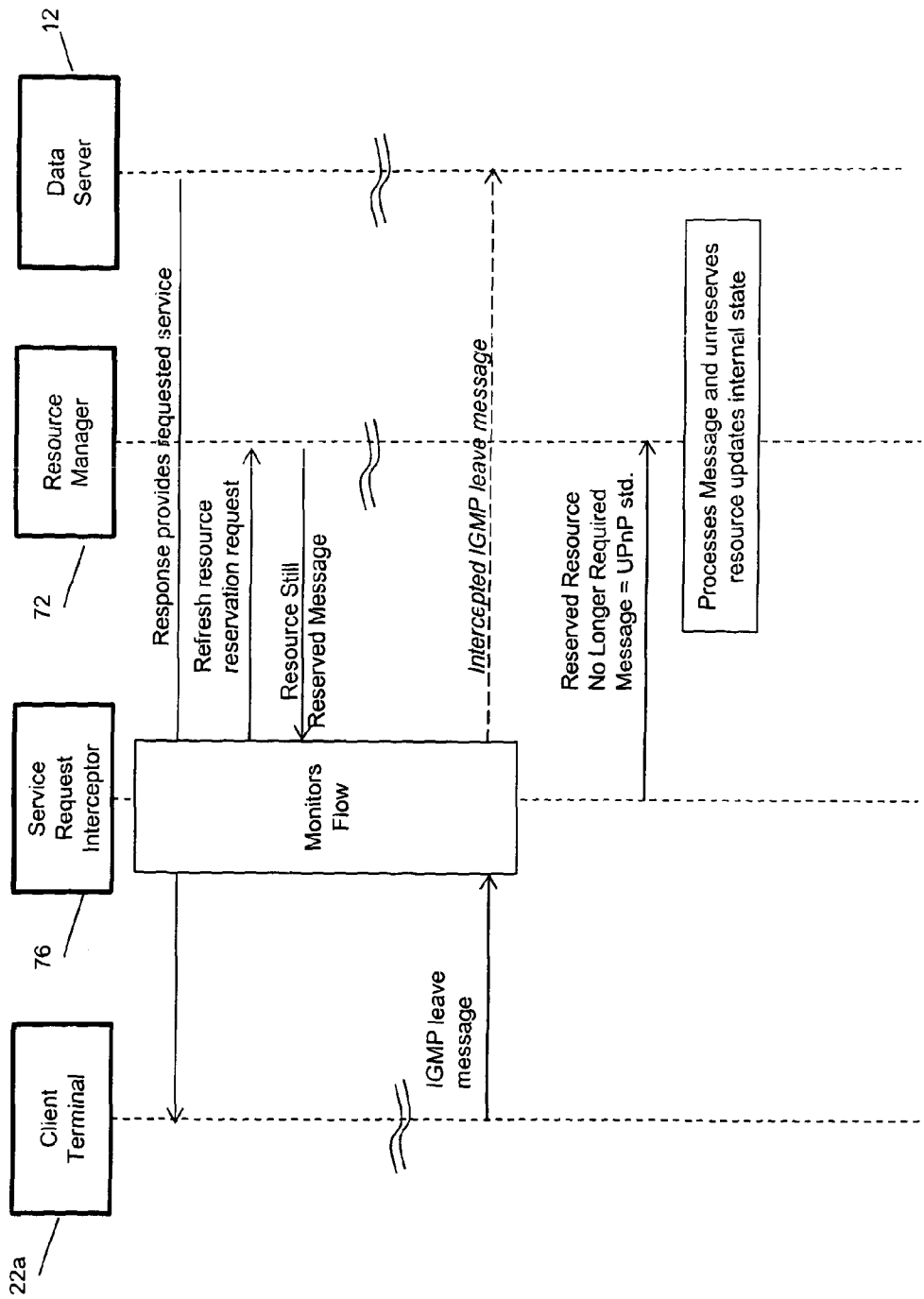
FIG. 10a shows how the QoS Service Manager is informed when an IGMP service session terminates according to an embodiment of the invention.
Figure 10B:
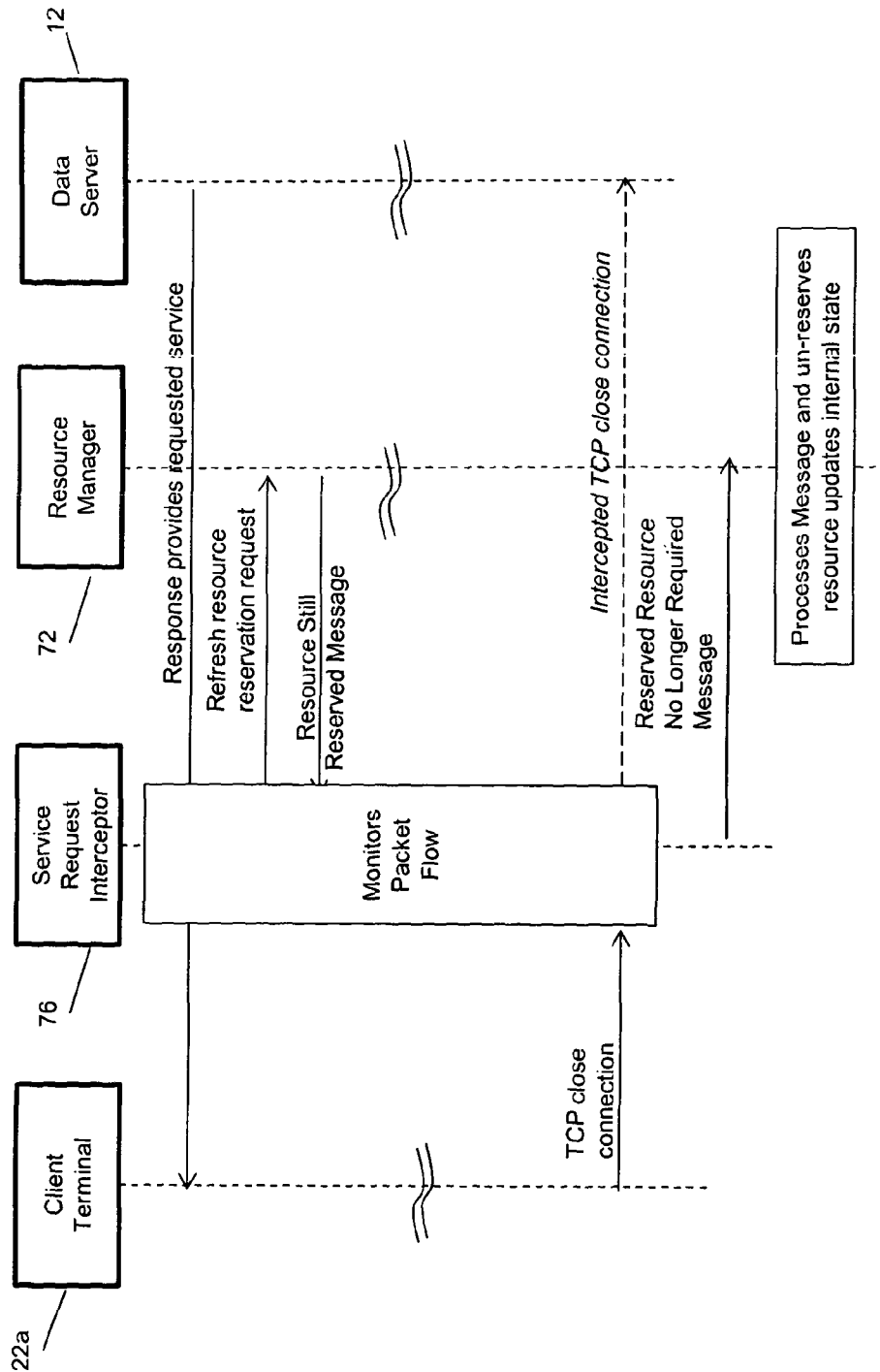
FIG. 10b shows how the QoS Service Manager is informed when an HTTP service session terminates according to an embodiment of the invention.

FIG. 10A shows how resources are released when an IGMP multicast session terminates. In FIG. 10A, which continues from FIG. 9, the SRI 76 continues to monitor the flow until an IGMP leave message is generated, at which point it sends a specific release message in accordance with the relevant UPnP QoS standard to which the UQoSM 76 conforms, which may then release the reservation and resources. An alternative is to simply cease to send UpdateTrafficQoS message for a flow for which a IGMP leave message has been received but this would not be a preferred solution. FIG. 10B shows how FIG. 9 would continue until a HTTP monitored traffic stream ceases to be received by client terminal 22a. In this case, the SRI 76 monitor the connection and intercept a TCP close connection message, which then would result in either a specific release message being sent to the QoS Service Manager 72, or, as mentioned above, another option although less tidy, would to just not send a refresh message.

Figure 11:
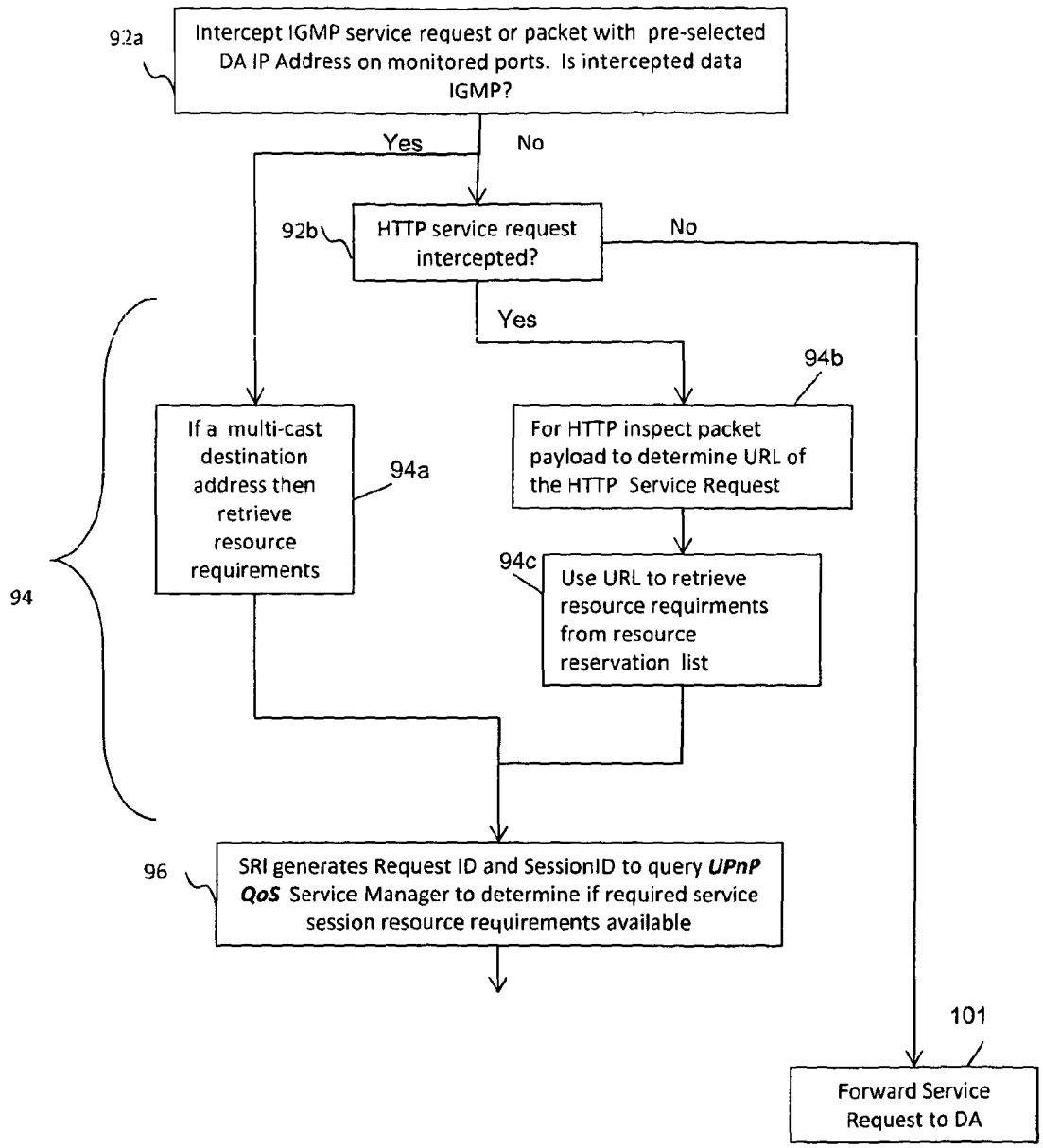
FIG. 11 shows how resource requirements are determined for HTTP and IGMP intercepted service requests.

FIG. 11 shows in more detail how for non-uPnP clients the SRI 76 needs to determine resource requirements from the URL (http) or the multicast address (IGMP). In the case of http we have the option of embedding meta-data tags in the HTTP request (this is shown separately in FIG. 12).

As shown in FIG. 11, the SRI 76 monitors all packets received on a client terminal facing port on router 18 and if it determines they are IGMP packets directed to a known multi-cast source or if the packets have a destination IP address for which a data record exists in a resource reservation data store (step 92a) it intercepts them. The data store may comprise a database or just a file in which IP Addresses are listed which correspond to an IP address for a remote data store 12 (or alternatively, internal data sources 20a).

All non-intercepted traffic is simply allowed to proceed towards its destination (101). If, however, the SRI intercepts an IGMP packet, the multi-cast destination address is used to retrieve the resource requirements for the stream requested (94a). If the SRI intercepts a packet which matches a IP address which the SRI is configured to filter on, the payload of the intercepted packet is inspected (94b) to determine if it comprises an HTTP request (94b) including a URL for a data server (12, 24). The remote data servers 12 may require resources to be reserved over the access link for the sessions established with the data consuming client terminal 22a. If a data consuming client terminal 22a has requested content from an internal data source 24, such as one which is distributing data in accordance with the Digital Live Network Alliance, the session resource requirements are internal within LAN 20.

The URL is then extracted and used by the SRI to perform a lookup operation to determine the resource requirements, if any, it will need to indicate to the QoS Service Manager (94c). Once the resources are known, the SRI queries the QoS Service Manager to request reservation of the required resources (96).

Rather than perform a look-up, the URL itself may convey sufficient information about the resource required to enable the SRI to directly determine resources it needs QoS Service Manager to reserve for the requested service. For example, part of the URL path can identify the type of content associated with that URL e.g. http://sd.cdd.bt.net/toy_story3-sd.avi for a standard definition traffic stream service request and http://hd.cdd.bt.net/toy_story3-hd.avi for a high definition traffic stream service request. A lookup is needed to determine for each standard definition or high definition channel identifiable from the service request the required bandwidth unless a URL is provided which indicates this and any other essential parameters of the traffic specification (Tspec), (including whether premium bandwidth is required at all) that the SRI 76 needs to provide to the UQoSM 72. By recognising the definition required from the URL itself, the SRI 76 use the corresponding bandwidth requirements for the relevant broadband access line 16 to request sufficient resources from the QoS Service Manager 72.

Figure 12:
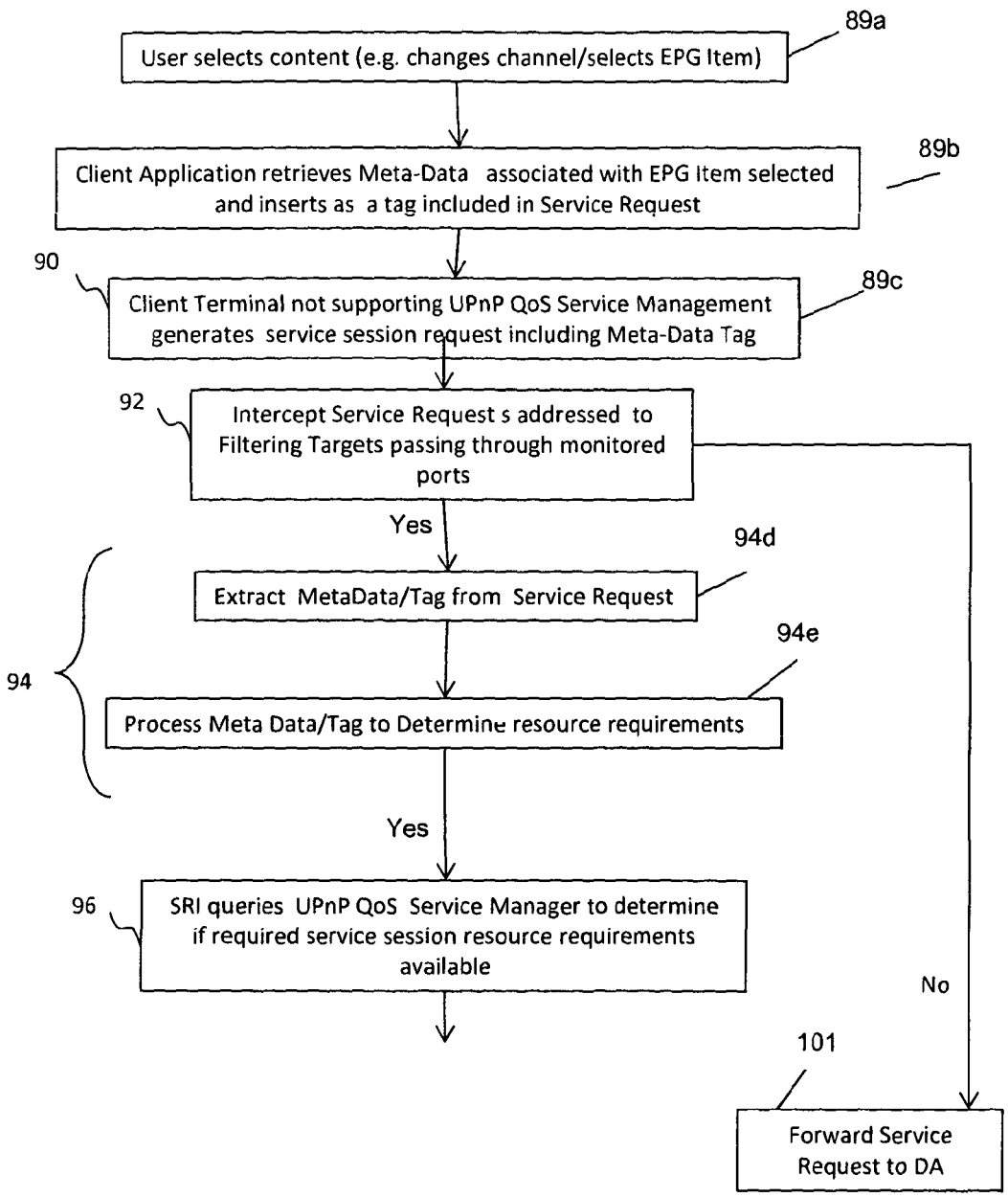
FIG. 12 shows an alternative way of determining resource requirements for HTTP and IGMP service requests.

FIG. 12 shows an alternative in which rather than the URL indicate the bandwidth, when a user selects a content item (step 89a) using a client application, the client application is configured to capture meta-data associated with the selected content item which is then included as a tag in the service request for that content item (step 89b). In this case, if the client terminal hosting the client application does not support UPnP QoS Service Management, the SRI 76 when it intercepts the service request for the selected content item (92), it extracts the meta-data provided in the form of a tag (94d) embedded within the service request) and determines the resource requirements (94e) from the meta-data tag. The resource requirements are then used in the traffic descriptor the SRI generates to provide to the UQoSM to reserve appropriate resources for the traffic stream corresponding to the requested content item (96).

All of the Figures described herein retain the numbering scheme for like elements unless specifically distinguished in the description.

Thus a Service Request Interceptor (SRI) 76 according to the invention is configured to apply a filter to traffic passing through ports facing client terminals in LAN 20 and filters out requests from non-UPnP QoS capable client devices so that the QoS Service Manager functions correctly and so that such clients can still receive a QoS managed service. The SRI 76 generates sufficient information to emulate the type of information that the UPnP Control Point would generate and include in a traffic descriptor to be included in a QoS Service Request.

In systems implementing the invention where adaptive bit rate is used which enables the encoded version a data stream received to be changed, repeat HTTP requests may be generated for different encoded versions. In such embodiments, the SRI 76 must perform an additional look up operation for each new HTTP request received after it has determined the source address, destination address and port facing the client terminal 22a and port facing the data server 12,24 to see the same ports are already being used to receive an existing traffic stream. If they are, the HTTP request is determined to relate to an earlier request at a different adaptive bit rate; i.e., to a different encoded version. Alternatively, the same determination can be made from the URL of the HTTP request if this conforms to a suitable naming convention. If the request received is a repeat HTTP request for a reservation which is to be maintained, the new HTTP request is linked to the earlier request and no additional request is forwarded to UQoSM 76 unless a change in the resource reservation requirements is determined and the original data stream is maintained. One way of managing this is at the Transmission Control Protocol (TCP) level as multiple HTTP requests can be serviced over the same TCP connection. As long as HTTP requests are capable of being seen to be occurring as part of the same TCP connection, they do not need to be processed any further.

There is a danger that delaying intermediate HTTP requests will lead to jittery VideoOnDemand services. One way of limiting jitter is if a criterion for a first level of intercept (either at the IP layer or the application layer) is updated whenever a new HTTP reservation is in place. This prevents blocking of subsequent HTTP requests in the same flow as the interception criteria changes from intercept all IP packets to known VoD IP addresses to all IP packets to known VoD addresses except packets with a specific source address (or more preferably with a specific source and destination port. In this way, the SRI applies a dynamically variable level of service request interception.

The client may also be configured to repeat service requests to the SRI 76, and the SRI 76 may be configured, instead of forwarding a reject from UQoSM 72 to the client terminal, to redirect the client terminal and wait for input from a user to be received by said web-server 103 regarding whether a user has a preference for the current session over another on-going session. If the user selects another on-going session, then the SRI 76 may send a repeat service session resource reservation request to the UQoSM 72 after a predetermined period of time has elapsed or in response to a suitable trigger event indicating another service session has been terminated.

The service request interceptor may also be arranged to prompt a client terminal to resubmit a request that has been previously refused or interrupted when demand for bandwidth reduces to a level where the request can be accommodated The text of the abstract repeated below forms part of the description: A service session resource manager for use in a router capable of routing a plurality of at least partially contemporaneous service sessions over a communications line is described which mediates between services competing for bandwidth. The service session manager updates its internal state based on both mediation enabled and mediation non-enabled devices. The resource manager comprises memory arranged to store a current resource utilisation indicator for a resource of said communications line, a service request processor arranged to process a new service session request from a client terminal to determine a required resource for said new service session over said communications line and to determine if the required resource is available in dependence on an available line rate and said current utilisation indicator, means to reserve the required resource, means to update said current utilisation indicator to indicate the allowed resource reservation; and means to respond to said requesting client that said resources have been reserved, wherein said current resource utilisation indicator is also updated by said service request processor to indicate a resource used by one or more service sessions established by one or more client terminals configured to send service requests over said communications line without requesting access to the service from said service session manager.

Persons of ordinary skill in the art will be aware of modifications and/or functional alternatives to one or more of the features described in the above embodiments and that features may have been omitted from the detailed description for the sake of brevity where their inclusion as a feature of the invention is apparent. The scope of the claimed invention should accordingly be determined from the accompanying claims when construed appropriately using the description in accordance with the knowledge of such persons of ordinary skill in the art and not limited to the literal examples described herein.

What is claimed is:

1. A service request interceptor arranged to intercept requests for data services generated by client terminals in a communications network, the interceptor comprising:

means to receive service requests generated by said plurality of client terminals;

means to determine a destination address of a received service request;

means to intercept a service request for content from a destination address determined to match one or more predetermined intercept-triggering destination addresses;

means to analyze said intercepted service request to determine, for each said intercepted service request, a required resource for said requested service;

means to forward a resource reservation request for the required resource to a resource manager, means to forward the received service request to said destination address in dependence on receiving an indication from said resource manager that the required resource has been reserved, and means to apply a dynamically variable level of service request interception by updating in response to a reservation being put in place, a criterion for interception of service requests; the updated criterion excepting from interception subsequent requests having a source address specific to the reservation in place.

2. A service request interceptor as claimed in claim 1, wherein the required resource for said requested service is derived from the destination address.

3. A service request interceptor as claimed in claim 1, wherein the required resource for said requested service is derived from a universal resource locator addressed by said service request.

4. A service request interceptor as claimed in claim 3, wherein the required resource is indicated by the format and/or content of the universal resource locator.

5. A service request interceptor as claimed in claim 1, wherein the required resource comprises bandwidth over a wired or wireless communications link.

6. A service request interceptor as claimed in claim 1, further comprising: means arranged to process a reject request message from said resource manager to extract information enabling concurrent service sessions for which resources have been reserved to be identified.

7. A service request interceptor according to claim 6, comprising:
 means to intercept a service session request generated by a service requesting client terminal;
 means to determine at least one session resource required for fulfillment of said service session request to maintain one or more predetermined delivery criteria;
 means to determine at least one required session resource is not available;
 means to reject said service request; and means to provide information to said service requesting user terminal on at least one other service session utilising said at least one service session resource, whereby a user of said client terminal is able to receive said information and in dependence thereon selectively modifying said at least one of said at least one other service sessions.

8. A service request interceptor as claimed in claim 6, further comprising:
 means to generate an information identifier for the extracted information; means to generate a re-direct message including said information identifier;
 means to send said re-direct message including said information identifier to a client terminal from which the rejected service request originated; and
 means to provide to a requesting data server said extracted information responsive to receiving an message requesting said extracted information from the requesting data server, the message identifying the information requested using said information identifier.

9. A service request interceptor system comprising:
 a service request interceptor as claimed in claim 8; and
 a data-server, the data server comprising:
 means arranged to receive a message from a client terminal; means to extract a said information identifier from a said received message;
 means to generate said message to request information from said service request interceptor, the message including said information identifier, whereby, responsive to receiving said information from said service request interceptor, said data-server provides said information to said client terminal.

10. A router for a local area network, the router capable of routing a plurality of at least partially contemporaneous service sessions over a communications link, the router including a service request interceptor as claimed in claim 1 and further comprising:
 a resource manager comprising:
 means to store a current resource utilisation indicator for a resource of said communications link;
 means to receive service session requests requiring resource reservation over said communications link;
 means to process received requests and to reserve a required resource if available over said communications link in dependence on said current resource utilisation indicator and a determination of the maximum resource availability over said communications link,
 wherein said current resource utilisation indicator is updated by a service request processor by analysis of requests being received from said service request interceptor to indicate a resource used by one or more service sessions established by one or more client terminals configured to send service requests over said communications line.

11. A router for a local communications network according to claim 10, the router comprising:
 a plurality of user ports, each port for connection to a said client terminal,
 an external connection port;
 switching means for transmitting data, and requests for data, between the ports, and said external connection port;
 a line speed checker;
 one or more data processors arranged to implement said service session resource manager and arranged for processing service session data requests received at each port and to select which service session requests are to be forwarded to the external connection port.

12. A method of service session resource management in which requests for data services generated by client terminals in a communications network are intercepted, the method comprising:
 a destination address of each received service request is determined;
 identifying service requests for content to be retrieved from destination addresses determined to match one or more predetermined intercept-triggering destination addresses;
 analyzing said intercepted service request to determine, for each said intercepted service request, a required resource for said requested service;
 generating a resource reservation request for the required resource, and determining if the required resource is available,
 if the required resource is available, reserving the required resource,
 forwarding the received request to said destination address if the required resource has been reserved, and
 applying a dynamically variable level of service request interception by updating, in response to a reservation being put in place, a criterion for interception of service requests; the updated criterion excepting from interception subsequent requests having a source address specific to the reservation in place.

13. A method according to claim 12, wherein the method further comprises:
 updating a current resource utilisation indicator to indicate a resource used by one or more service sessions established by one or more client terminals configured to send service requests over said communications line without requesting access to the service from a service session manager.

14. A method according to claim 12, the method further comprising:

intercepting a service session request generated by a service requesting client terminal;

determining at least one session resource required for fulfillment of said service session request to maintain one or more predetermined delivery criteria;

determining at least one required session resource is not available;

rejecting said service request; and providing information to said service requesting user terminal on at least one other service session utilising said at least one service session resource, whereby a user of said client terminal is able to receive said information and in dependence thereon selectively modifying said at least one of said at least one other service sessions.

15. The service request interceptor according to claim 1, wherein the requested resource is a content stream, and the analysis performed by the means to analyze said intercepted service request to determine the required resource includes determining media characteristics associated with the content stream.

16. The service request interceptor according to claim 15, wherein the determined media characteristics associated with the content stream is that the content stream comprises a high definition television channel.

17. The method according to claim 12, wherein the requested resource is a content stream, and analyzing said intercepted service request to determine the required resource includes determining media characteristics associated with the content stream.

18. The method according to claim 17, wherein the determined media characteristics associated with the content stream is that the content stream comprises a high definition television channel.

19. The method according to claim 12, wherein the required resource for said requested service is derived from the destination address.

20. The method according to claim 12, wherein the required resource for said requested service is derived from a universal resource locator addressed by said service request.

21. The method according to claim 12, wherein the required resource is indicated by the format and/or content of the universal resource locator.

22. The method according to claim 12, wherein the required resource comprises bandwidth over a wired or wireless communications link.

23. A service request interceptor arranged to intercept requests for data services generated by client terminals in a communications network, the interceptor comprising:

a computer processing system, including a computer hardware processor and a memory, the computer processing system being at least configured to:

receive service requests generated by said plurality of client terminals;

determine a destination address of a received service request;

intercept a service request for content from a destination address determined to match one or more predetermined intercept-triggering destination addresses;

analyze said intercepted service request to determine, for each said intercepted service request, a required resource for said requested service;

forward a resource reservation request for the required resource to a resource manager;

forward the received service request to said destination address in dependence on receiving an indication from said resource manager that the required resource has been reserved, and apply a dynamically variable level of service request interception by updating, in response to a reservation being put in place, a criterion for interception of service requests; the updated criterion excepting from interception subsequent requests having a source address specific to the reservation in place.

24. The service request interceptor according to claim 23, wherein the requested resource is a content stream, and the analysis performed by the computer processing system to analyze said intercepted service request to determine the required resource includes determining media characteristics associated with the content stream.

25. The service request interceptor according to claim 24, wherein the determined media characteristics associated with the content stream is that the content stream comprises a high definition television channel.

* * * * *